US011977091B2

(12) United States Patent
Lawrence et al.

(10) Patent No.: US 11,977,091 B2
(45) Date of Patent: May 7, 2024

(54) POINT-OF-CARE MEDICAL DIAGNOSTIC ANALYZER AND DEVICES, SYSTEMS, AND METHODS FOR MEDICAL DIAGNOSTIC ANALYSIS OF SAMPLES

(71) Applicant: IDEXX Laboratories Inc., Westbrook, ME (US)

(72) Inventors: Jonathan W. Lawrence, Yarmouth, ME (US); Mark R. Dumont, Scarborough, ME (US); Jason J. Aguiar, Freeport, ME (US); John H. McGibbon, Old Orchard Beach, ME (US); Nicholas P. Prince, Gray, ME (US)

(73) Assignee: IDEXX LABORATORIES INC., Westbrook, ME (US)

( * ) Notice: Subject to any disclaimer, the term of this patent is extended or adjusted under 35 U.S.C. 154(b) by 131 days.

(21) Appl. No.: 17/371,852

(22) Filed: Jul. 9, 2021

(65) Prior Publication Data
US 2022/0011328 A1    Jan. 13, 2022

Related U.S. Application Data

(60) Provisional application No. 63/050,129, filed on Jul. 10, 2020.

(51) Int. Cl.
*G01N 35/00* (2006.01)
*G01N 15/14* (2006.01)
*G01N 15/1404* (2024.01)

(52) U.S. Cl.
CPC ..... *G01N 35/0099* (2013.01); *G01N 15/1404* (2013.01)

(58) Field of Classification Search
CPC .............. G01N 35/0099; G01N 15/1404
See application file for complete search history.

(56) References Cited

U.S. PATENT DOCUMENTS 2,058,516 A    10/1936  Schaaff
2,204,471 A     6/1940  Campbell, Jr. et al.
(Continued)

FOREIGN PATENT DOCUMENTS

CN    108732081 A    11/2018
EP     0042337 A1    12/1981
(Continued)

OTHER PUBLICATIONS

Notification Concerning Transmittal of International Preliminary Report on Patentability (Chapter I of the Patent Cooperation Treaty), in English, dated Nov. 19, 2009, the International Preliminary Report on Patentability (Chapter I of the Patent Cooperation Treaty), in English, dated Nov. 10, 2009, the Written Opinion of the International Searching Authority, in English, dated Sep. 17, 2008, and the International Search Report, in English, dated Sep. 17, 2008, which were issued by the International Bureau of WIPO for Applicants' corresponding PCT Application No. PCT/US08/005909.

(Continued)

*Primary Examiner* — Jill A Warden
*Assistant Examiner* — Alex Ramirez
(74) *Attorney, Agent, or Firm* — Carter, DeLuca & Farrell LLP

(57) ABSTRACT

An analyzer having an inner chassis surrounded by a housing includes sample and dilution probes, a mixing housing including first and second mixing chambers, a flow cytometer including a flow cell, and sample and sheath pumps configured to perform first and second pluralities of tasks, respectively. The first plurality of tasks includes: aspirating sample into the sample probe, dispensing sample from the sample probe into the first and second mixing chambers, delivering first sample-dilution fluid mixture to the flow cell, and delivering second sample-dilution fluid mixture to the (Continued)

flow cell. The second plurality of tasks includes: dispensing sheath to the flow cell in cooperation with the delivery of the first sample-dilution fluid mixture to the flow cell, and dispensing sheath to the flow cell in cooperation with the delivery of the second sample-dilution fluid mixture to the flow cell.

10 Claims, 25 Drawing Sheets

(56) References Cited

U.S. PATENT DOCUMENTS

| | | |
|---|---|---|
| 2,363,474 A | 11/1944 | Schlesinger |
| 2,586,513 A | 2/1952 | Butler |
| 2,598,869 A | 6/1952 | White |
| 2,665,825 A | 1/1954 | Poitras et al. |
| 2,692,820 A | 10/1954 | Alway et al. |
| 2,721,008 A | 10/1955 | Morgan, Jr. |
| 2,797,149 A | 6/1957 | Skeggs |
| 2,802,605 A | 8/1957 | Parker |
| 3,036,893 A | 5/1962 | Natelson |
| 3,106,845 A | 10/1963 | Dimmick |
| 3,164,304 A | 1/1965 | Jager et al. |
| 3,190,731 A | 6/1965 | Weiskopf |
| 3,300,099 A | 1/1967 | Marona |
| 3,323,689 A | 6/1967 | Elmore |
| 3,341,087 A | 9/1967 | Rosin et al. |
| 3,367,746 A | 2/1968 | Maurukas |
| 3,449,081 A | 6/1969 | Hughes |
| 3,460,529 A | 8/1969 | Leucci |
| 3,526,480 A | 9/1970 | Findl et al. |
| 3,533,744 A | 10/1970 | Unger |
| 3,572,400 A | 3/1971 | Casner et al. |
| 3,574,064 A | 4/1971 | Binnings et al. |
| 3,615,240 A | 10/1971 | Sanz |
| 3,616,264 A | 10/1971 | Ray et al. |
| 3,618,829 A | 11/1971 | Elmore et al. |
| 3,645,423 A | 2/1972 | DeGraw |
| 3,650,437 A | 3/1972 | Binnings et al. |
| 3,659,934 A | 5/1972 | Costanza et al. |
| 3,675,488 A | 7/1972 | Viktora et al. |
| 3,748,044 A | 7/1973 | Liston |
| 3,754,866 A | 8/1973 | Ritchie et al. |
| 3,756,920 A | 9/1973 | Kelbaugh et al. |
| 3,758,274 A | 9/1973 | Ritchie et al. |
| 3,788,816 A | 1/1974 | Rohrbaugh et al. |
| 3,790,346 A | 2/1974 | Ritchie |
| 3,810,779 A | 5/1974 | Pickett et al. |
| 3,832,135 A | 8/1974 | Drozdowski et al. |
| 3,855,867 A | 12/1974 | Roach |
| 3,856,470 A | 12/1974 | Cullis et al. |
| 3,873,273 A | 3/1975 | Moran et al. |
| 3,883,308 A | 5/1975 | Matte |
| 3,904,372 A | 9/1975 | Lightner |
| 3,915,651 A | 10/1975 | Nishi |
| 3,918,913 A | 11/1975 | Stevenson et al. |
| 3,926,514 A | 12/1975 | Costanza et al. |
| 3,942,952 A | 3/1976 | Atwood |
| 4,041,995 A | 8/1977 | Columbus |
| 4,043,756 A | 8/1977 | Sommervold |
| 4,052,161 A | 10/1977 | Atwood et al. |
| 4,059,405 A | 11/1977 | Sodickson et al. |
| 4,061,469 A | 12/1977 | DuBose |
| 4,067,694 A | 1/1978 | Blakely et al. |
| 4,090,791 A | 5/1978 | Siddiqi et al. |
| 4,118,280 A | 10/1978 | Charles et al. |
| 4,119,381 A | 10/1978 | Muka et al. |
| 4,142,656 A | 3/1979 | Smith et al. |
| 4,152,390 A | 5/1979 | Nosco et al. |
| 4,160,646 A | 7/1979 | Furutani et al. |
| 4,161,508 A | 7/1979 | Janchen |
| 4,198,483 A | 4/1980 | Sogi et al. |
| 4,198,485 A | 4/1980 | Stark, Jr. |
| 4,210,724 A | 7/1980 | Sogi et al. |
| 4,219,529 A | 8/1980 | Tersteeg et al. |
| 4,224,032 A | 9/1980 | Glover et al. |
| 4,234,538 A | 11/1980 | Ginsberg et al. |
| 4,234,539 A | 11/1980 | Ginsberg et al. |
| 4,236,894 A | 12/1980 | Sommervold |
| 4,264,560 A | 4/1981 | Natelson |
| 4,271,123 A | 6/1981 | Curry et al. |
| 4,272,482 A | 6/1981 | Jessop et al. |
| 4,277,440 A | 7/1981 | Jessop et al. |
| 4,287,155 A | 9/1981 | Tersteeg et al. |
| 4,296,069 A | 10/1981 | Smith et al. |
| 4,296,070 A | 10/1981 | Montalto et al. |
| 4,298,571 A | 11/1981 | DiFulvio et al. |
| 4,298,575 A | 11/1981 | Berglund |
| 4,302,420 A | 11/1981 | Jakubowicz et al. |
| 4,303,611 A | 12/1981 | Jessop |
| 4,308,231 A | 12/1981 | Kolber et al. |
| 4,321,122 A | 3/1982 | Whitcomb et al. |
| 4,325,909 A | 4/1982 | Coulter et al. |
| 4,335,620 A | 6/1982 | Adams |
| 4,340,390 A | 7/1982 | Collins et al. |
| 4,347,750 A | 9/1982 | Tersteeg et al. |
| 4,351,799 A | 9/1982 | Gross et al. |
| 4,359,447 A | 11/1982 | Welch |
| RE31,150 E | 2/1983 | Ginsberg et al. |
| 4,387,990 A | 6/1983 | Yazawa et al. |
| 4,392,195 A | 7/1983 | Inoue |
| 4,399,711 A | 8/1983 | Klein |
| 4,420,566 A | 12/1983 | Jessop et al. |
| 4,424,191 A | 1/1984 | Jakubowicz |
| 4,429,373 A | 1/1984 | Fletcher et al. |
| 4,430,299 A | 2/1984 | Horne |
| 4,441,532 A | 4/1984 | Hrubesh |
| 4,451,433 A | 5/1984 | Yamashita et al. |
| 4,452,899 A | 6/1984 | Alston |
| 4,455,280 A | 6/1984 | Shinohara et al. |
| 4,475,666 A | 10/1984 | Bilbrey et al. |
| 4,488,810 A | 12/1984 | Hatanaka et al. |
| 4,503,011 A | 3/1985 | Hubeau |
| 4,512,952 A | 4/1985 | Blanding et al. |
| 4,522,921 A | 6/1985 | Ogawa |
| 4,539,855 A | 9/1985 | Jacobs |
| 4,540,549 A | 9/1985 | Manabe |
| 4,549,809 A | 10/1985 | Minekane et al. |
| D282,203 S | 1/1986 | Leonard et al. |
| 4,568,519 A | 2/1986 | Hamilton et al. |
| 4,584,275 A | 4/1986 | Okano et al. |
| 4,586,546 A | 5/1986 | Mezei |
| 4,599,219 A | 7/1986 | Cooper et al. |
| 4,615,360 A | 10/1986 | Jacobs |
| 4,627,014 A | 12/1986 | Lo et al. |
| 4,629,703 A | 12/1986 | Uffenheimer |
| 4,644,807 A | 2/1987 | Mar |
| 4,647,431 A | 3/1987 | Sekine et al. |
| 4,656,006 A | 4/1987 | Assmann et al. |
| 4,656,007 A | 4/1987 | Douchy et al. |
| 4,670,219 A | 6/1987 | Nelson et al. |
| 4,675,301 A | 6/1987 | Charneski et al. |
| 4,678,755 A | 7/1987 | Shinohara et al. |
| 4,680,164 A | 7/1987 | Kelln |
| 4,681,741 A | 7/1987 | Hanaway |
| 4,695,430 A | 9/1987 | Coville et al. |
| 4,706,207 A | 11/1987 | Hennessy et al. |
| 4,710,352 A | 12/1987 | Slater et al. |
| 4,713,974 A | 12/1987 | Stone |
| 4,719,085 A | 1/1988 | Jacobs |
| 4,731,058 A | 3/1988 | Doan |
| 4,737,344 A | 4/1988 | Koizumi et al. |
| 4,738,826 A | 4/1988 | Harris |
| 4,752,449 A | 6/1988 | Jackson et al. |
| 4,757,449 A | 7/1988 | Kurihara et al. |
| 4,761,268 A | 8/1988 | Andersen et al. |
| 4,769,009 A | 9/1988 | Dykstra |
| 4,770,053 A | 9/1988 | Broderick et al. |
| 4,774,055 A | 9/1988 | Wakatake et al. |
| 4,785,407 A | 11/1988 | Sakagami |
| 4,794,085 A | 12/1988 | Jessop et al. |
| 4,795,613 A | 1/1989 | Azuma et al. |
| 4,798,705 A | 1/1989 | Jakubowicz et al. |

(56) References Cited

U.S. PATENT DOCUMENTS

| | | |
|---|---|---|
| 4,808,380 A | 2/1989 | Minekane |
| 4,814,279 A | 3/1989 | Sugaya |
| 4,821,586 A | 4/1989 | Scordato et al. |
| 4,823,992 A | 4/1989 | Fiorentini |
| 4,826,659 A | 5/1989 | Akisada |
| 4,837,159 A | 6/1989 | Yamada |
| 4,841,208 A | 6/1989 | Itoh |
| 4,855,109 A | 8/1989 | Muraishi et al. |
| 4,863,695 A | 9/1989 | Fullemann |
| 4,928,540 A | 5/1990 | Kido et al. |
| 4,931,257 A | 6/1990 | Quenin et al. |
| 4,935,374 A | 6/1990 | Jacobs et al. |
| 4,943,415 A | 7/1990 | Przybylowicz et al. |
| 4,963,333 A | 10/1990 | Shaw et al. |
| 4,970,468 A | 11/1990 | Ishizawa |
| 5,034,191 A | 7/1991 | Porte |
| 5,037,613 A | 8/1991 | Shaw et al. |
| 5,039,615 A | 8/1991 | Takahata |
| 5,049,359 A | 9/1991 | Azuma et al. |
| 5,049,487 A | 9/1991 | Phillips et al. |
| 5,075,079 A | 12/1991 | Kerr et al. |
| 5,089,229 A | 2/1992 | Heidt et al. |
| 5,102,624 A | 4/1992 | Muraishi |
| 5,126,952 A | 6/1992 | Kildal-Brandt et al. |
| 5,141,871 A | 8/1992 | Kureshy et al. |
| 5,149,501 A | 9/1992 | Babson et al. |
| 5,174,960 A | 12/1992 | Shaw et al. |
| 5,174,963 A | 12/1992 | Fuller et al. |
| 5,182,083 A | 1/1993 | Barker et al. |
| 5,213,764 A | 5/1993 | Kerr et al. |
| 5,250,262 A | 10/1993 | Heidt et al. |
| 5,257,212 A | 10/1993 | Kildal-Brandt et al. |
| 5,283,195 A | 2/1994 | Muszak et al. |
| 5,304,350 A | 4/1994 | Meserol |
| 5,314,825 A | 5/1994 | Weyrauch et al. |
| 5,336,467 A | 8/1994 | Heidt et al. |
| 5,340,540 A | 8/1994 | Miller |
| 5,425,918 A | 6/1995 | Healey et al. |
| 5,455,008 A | 10/1995 | Earley et al. |
| 5,463,895 A | 11/1995 | Brentz |
| 5,474,910 A | 12/1995 | Alfano |
| 5,478,750 A | 12/1995 | Bernstein et al. |
| 5,483,843 A | 1/1996 | Miller et al. |
| 5,525,514 A | 6/1996 | Jacobs et al. |
| 5,525,551 A | 6/1996 | Ohta |
| 5,645,798 A | 7/1997 | Schreiber et al. |
| 5,653,942 A | 8/1997 | Terashima et al. |
| 5,654,200 A | 8/1997 | Copeland et al. |
| 5,658,532 A | 8/1997 | Kurosaki et al. |
| 5,730,939 A | 3/1998 | Kurumada et al. |
| 5,753,512 A | 5/1998 | Riall et al. |
| 5,772,962 A | 6/1998 | Uchida et al. |
| 5,811,306 A | 9/1998 | Komatsu |
| 5,837,546 A | 11/1998 | Allen et al. |
| 5,879,944 A | 3/1999 | Komatsu |
| 5,897,837 A | 4/1999 | Mizuno |
| 6,013,528 A | 1/2000 | Jacobs et al. |
| 6,136,270 A | 10/2000 | Maes et al. |
| 6,183,693 B1 | 2/2001 | Bogen et al. |
| 6,268,162 B1 | 7/2001 | Phillips et al. |
| 6,296,809 B1 | 10/2001 | Richards et al. |
| 6,326,160 B1 | 12/2001 | Dunn et al. |
| 6,352,861 B1 | 3/2002 | Copeland et al. |
| 6,372,485 B1 | 4/2002 | Clark et al. |
| 6,387,326 B1 | 5/2002 | Edwards et al. |
| 6,458,324 B1 | 10/2002 | Schinzel |
| 6,531,094 B2 | 3/2003 | Seto et al. |
| 6,531,095 B2 | 3/2003 | Hammer et al. |
| 6,663,832 B2 | 12/2003 | Lebl et al. |
| 6,783,733 B2 | 8/2004 | Bogen et al. |
| 6,797,518 B1 | 9/2004 | Jacobs et al. |
| 6,830,731 B1 | 12/2004 | Buechler et al. |
| 6,890,761 B2 | 5/2005 | Ishizawa et al. |
| 6,913,933 B2 | 7/2005 | Jacobs et al. |
| 6,919,044 B1 | 7/2005 | Shibata et al. |
| 6,937,955 B2 | 8/2005 | Barnes |
| 6,984,527 B2 | 1/2006 | Miller |
| 7,198,956 B2 | 4/2007 | Uffenheimer et al. |
| 7,256,045 B2 | 8/2007 | Jacobs et al. |
| 7,270,785 B1 | 9/2007 | Lemme et al. |
| 7,616,317 B2 | 11/2009 | Misener et al. |
| 7,632,468 B2 | 12/2009 | Barski et al. |
| 8,189,187 B2 | 5/2012 | Graham et al. |
| 8,287,823 B2 | 10/2012 | Sellers et al. |
| 8,585,989 B2 | 11/2013 | Rich et al. |
| 9,797,916 B2 | 10/2017 | Connolly et al. |
| 9,823,109 B2 | 11/2017 | Garrepy et al. |
| 2001/0019826 A1 | 9/2001 | Ammann |
| 2002/0054830 A1 | 5/2002 | Bogen et al. |
| 2002/0182108 A1 | 12/2002 | Ishihara et al. |
| 2003/0022380 A1 | 1/2003 | Jakubowicz et al. |
| 2003/0027206 A1 | 2/2003 | Ammann et al. |
| 2003/0104634 A1 | 6/2003 | Jacobs et al. |
| 2004/0072363 A1 | 4/2004 | Schembri |
| 2004/0191923 A1 | 9/2004 | Tomasso et al. |
| 2005/0036911 A1 | 2/2005 | Sellers et al. |
| 2005/0123445 A1* | 6/2005 | Blecka ............... G01N 35/0099 422/64 |
| 2005/0286265 A1 | 12/2005 | Zampini |
| 2006/0148063 A1 | 7/2006 | Fauzzi et al. |
| 2006/0211253 A1 | 9/2006 | Chen et al. |
| 2006/0275892 A1 | 12/2006 | Shibazaki |
| 2007/0166194 A1 | 7/2007 | Wakatake |
| 2010/0254854 A1 | 10/2010 | Rich et al. |
| 2011/0093207 A1 | 4/2011 | Ingber et al. |
| 2011/0304722 A1 | 12/2011 | Nilsson et al. |
| 2013/0065797 A1 | 3/2013 | Silbert |
| 2013/0132006 A1 | 5/2013 | Gwynn et al. |
| 2015/0226759 A1* | 8/2015 | Connolly ......... G01N 35/00732 901/41 |
| 2018/0093204 A1* | 4/2018 | Glover ................ G01N 1/2035 |

FOREIGN PATENT DOCUMENTS

| | | |
|---|---|---|
| EP | 0042340 A1 | 12/1981 |
| EP | 0341438 A2 | 11/1989 |
| EP | 0353592 A2 | 2/1990 |
| EP | 2356426 A1 | 8/2011 |
| JP | S57182653 A | 11/1982 |
| JP | S62194464 A | 8/1987 |
| JP | H02-189443 A | 7/1990 |
| JP | H06-194300 A | 7/1994 |
| JP | H10-260129 A | 9/1998 |
| JP | 2004-093365 A | 3/2004 |
| JP | 4072399 B2 | 4/2008 |
| WO | 9108463 A2 | 6/1991 |
| WO | 9605488 A1 | 2/1996 |
| WO | 2008140742 A1 | 11/2008 |
| WO | 2013106269 A2 | 7/2013 |

OTHER PUBLICATIONS

Notification of Transmittal of the International Search Report and the Written Opinion of the International Searching Authority, or the Declaration, in English, dated Mar. 25, 2015, the Written Opinion of the International Searching Authority, in English, dated Mar. 25, 2015, and the International Search Report, in English, dated Mar. 25, 2015, which were issued by the International Bureau of WIPO for Applicants' related PCT Application No. PCT/US15/10671, filed on Jan. 8, 2015.

International Preliminary Report on Patentability (Chapter I of the Patent Cooperation Treaty), in English, dated Nov. 7. 2006, Written Opinion of the International Searching Authority, in English, dated Aug. 23, 2006, and the International Search Report, in English, dated Aug. 23, 2006, which were issued by the International Bureau of WIPO for Applicants' related PCT Application No. PCT/US04/25073, filed on Aug. 4, 2004.

Notification of Transmittal of the International Search Report and Written Opinion of the International Searching Authority, or Declaration, in English, dated Mar. 25, 2015; the International Search

(56) References Cited

OTHER PUBLICATIONS

Report, in English, dated Mar. 25, 2015; and the Written Opinion of the International Searching Authority, in English, dated Mar. 25, 2015, each of which was issued by the International Bureau of WIPO for Applicant's corresponding PCT Application No. PCT/US15/10671, filed on Jan. 8, 2015.
International Report on Patentability issued in corresponding International Application No. PCT/US2021/041096 dated Jan. 10, 2023, pp. 1-19.
International Search Report & Written Opinion issued in corresponding International Application No. PCT/US2021/041096 dated Jan. 5, 2022, pp. 1-31.
Notice of Reasons for Rejection issued by the Japanese Patent Office dated Oct. 17, 2023 in corresponding JP Patent Application No. 2023-501149, with English translation.

* cited by examiner

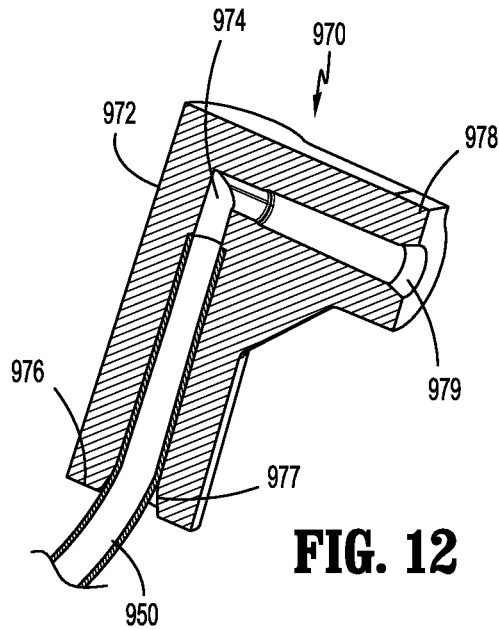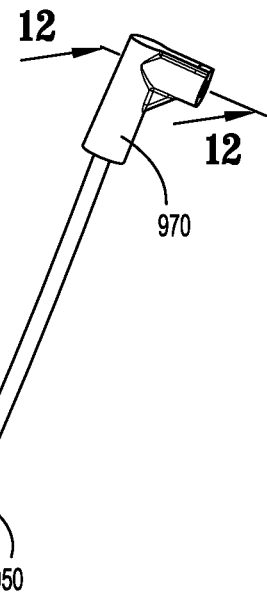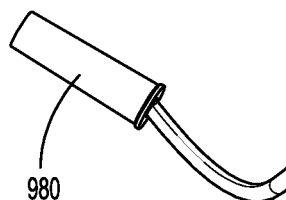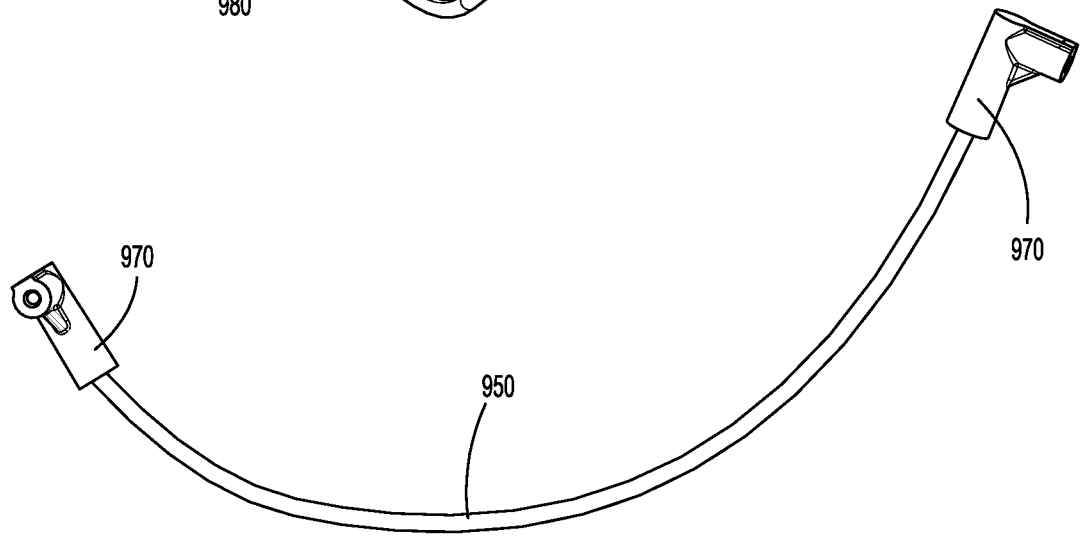
FIG. 10
FIG. 11
FIG. 12

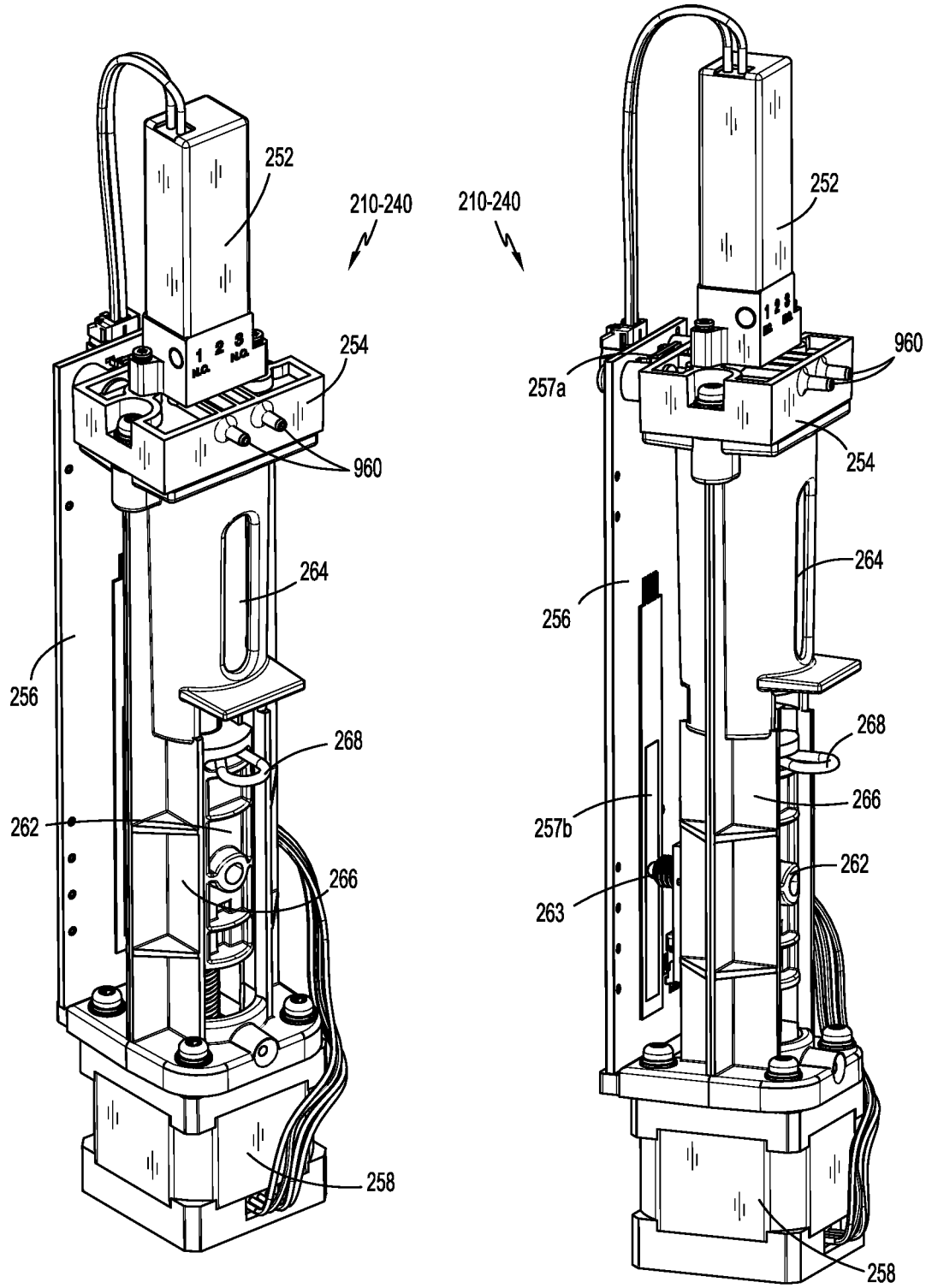
FIG. 16  FIG. 17

POINT-OF-CARE MEDICAL DIAGNOSTIC ANALYZER AND DEVICES, SYSTEMS, AND METHODS FOR MEDICAL DIAGNOSTIC ANALYSIS OF SAMPLES

CROSS-REFERENCE TO RELATED APPLICATIONS

This application claims the benefit of, and priority to, U.S. Provisional Patent Application No. 63/050,129, filed on Jul. 10, 2020, the entire contents of which are hereby incorporated herein by reference.

FIELD

The present disclosure relates to medical diagnostics and, more particularly, to a point-of-care medical diagnostic analyzer and devices, systems, and methods for medical diagnostic analysis of a sample.

BACKGROUND

Medical guidance for many medical diagnostic systems such as hematology analyzers recommends analyzing a sample as soon as possible after drawing the sample. This recommendation can be difficult to follow if the sample is obtained at a point of care but the test is to be performed at an external or remote laboratory. Therefore, many doctors and veterinarians prefer to have point-of-care medical diagnostics analyzers to analyze fresh samples.

Point of care medical diagnostic analyzers such as hematology analyzers may utilize, for example, flow cytometry to determine the cellular contents of a blood sample. Blood cell measurements made using flow cytometry often require at least two separate measurements—one to measure red blood cells ("RBCs") and platelets, and the other to measure white blood cells ("WBCs").

Hematology analyzers, in preparing samples for delivery to the flow cytometer, may automatically create a dilution of a whole blood sample in at least two steps performed serially or in parallel. Whether performed serially or in parallel, a minimum of two reaction chambers are utilized. One chamber may be used for the RBCs, while the other chamber is used for the WBCs. In some analyzers, an additional chamber is utilized, for example, to perform analyses of hemoglobin concentration. Each of these reaction chambers in such hematology analyzers are usually contained within the instrument, and must be rinsed between sample runs to prevent sample carryover.

As can be appreciated, in order for a hematology analyzer to perform the necessary tasks in the reaction chambers, deliver the samples to the flow cytometer, and rinse the fluid paths between sample runs, a multitude of fluid handling components are required. These components include, for example: pumps to move diluent and/or cleaning solution around the system; pumps to remove fluid from the reaction chambers; valves to control the movement of fluids; metering devices to precisely aliquot sample and reagents to the reaction chambers; and tubing to connect all the fluid handling components. Thus, hematology analyzers are complex instruments with many cooperating systems and components.

SUMMARY

To the extent consistent, any of the aspects and features detailed herein may be utilized with or without any of the other aspects and features detailed herein, regardless of whether such aspects and features are described together or separately hereinbelow. Further, it is understood that reference to any specific numerical value herein encompasses a range of values to take into account material and manufacturing tolerances generally accepted in the art and/or margins of error of measurement equipment generally accepted in the art.

Provided in accordance with aspects of the present disclosure is an analyzer including an inner chassis, a housing surrounding the inner chassis, a sample probe operably coupled to the inner chassis within the housing and movable relative thereto, a dilution probe operably coupled to the inner chassis within the housing and movable relative thereto, a mixing housing supported on the inner chassis within the housing and defining first and second mixing chambers each configured to receive dilution fluid, a flow cytometer supported on the inner chassis within the housing and including a flow cell, a sample pump, and a sheath pump. The sample pump is disposed within the housing and configured to perform a first plurality of tasks including: aspirating sample into the sample probe, dispensing sample from the sample probe into the first mixing chamber, dispensing sample from the sample probe into the second mixing chamber, delivering first sample-dilution fluid mixture to the flow cell, and delivering second sample-dilution fluid mixture to the flow cell. The sheath pump is disposed within the housing and configured to perform a second plurality of tasks including: dispensing sheath to the flow cell in cooperation with the delivery of the first sample-dilution fluid mixture to the flow cell, and dispensing sheath to the flow cell in cooperation with the delivery of the second sample-dilution fluid mixture to the flow cell.

In an aspect of the present disclosure, the analyzer further includes a carrier supporting the sample probe and the dilution probe in fixed orientation relative to one another. The carrier is operably coupled to the inner chassis within the housing and movable relative thereto to operably position the sample probe and the dilution probe for enabling at least some of the first and second pluralities of tasks.

In another aspect of the present disclosure, a robot assembly configured to maneuver the carrier in a y-direction and a z-direction relative to the inner chassis to thereby position the sample probe and the dilution probe for enabling the at least some of the first and second pluralities of tasks is provided. The robot assembly may, in aspects, include y-axis and z-axis potentiometers configured to enable feedback-based control of movement of the carrier in each of the y-direction and the z-direction.

In yet another aspect of the present disclosure, the analyzer further includes first and second dilution pumps disposed within the housing and configured to deliver the dilution fluid to the first and second mixing chambers, respectively.

In still another aspect of the present disclosure, the analyzer further includes a peristaltic pump configured to perform a third plurality of tasks including: aspirating the first sample-dilution fluid from the first mixing chamber into the dilution probe, aspirating the second sample-dilution fluid from the second mixing chamber into the dilution probe, aspirating the first sample-dilution fluid mixture through the dilution probe in preparation for delivery thereof to the flow cell, aspirating the second sample-dilution fluid mixture through the dilution probe in preparation for delivery thereof to the flow cell, aspirating remaining fluid in the first mixing chamber to waste, and aspirating remaining fluid in the second mixing chamber to waste.

In still yet another aspect of the present disclosure, the second plurality of tasks further includes: dispensing sheath to the first mixing chamber to clean the first mixing chamber, and dispensing sheath to the second mixing chamber to clean the second mixing chamber.

In another aspect of the present disclosure, the mixing housing further defines a cleaning chamber, and wherein the second plurality of tasks further includes: dispensing sheath to the cleaning chamber to clean a portion of the sample probe disposed therein. The mixing housing additionally or alternatively defines a clearance cavity configured to receive one of the sample probe or the dilution probe when the other of the sample probe or the dilution probe is inserted into one of the first or second mixing chambers.

In still another aspect of the present disclosure, the analyzer further includes a hemoglobin assembly disposed in parallel with the flow cell.

In yet another aspect of the present disclosure, the analyzer includes a door providing selective access through the outer housing to the inner chassis for selective insertion and removal of at least one pack including reagent fluid and sheath fluid.

In another aspect of the present disclosure, the analyzer includes a drawer providing selective access through the outer housing to the inner chassis for selective insertion and removal of a sample tube containing sample.

In still yet another aspect of the present disclosure, the analyzer further includes a fluidic capacitor-filter-resistor circuit disposed within a sheath flow line such that sheath dispensed to the flow cell passes through the fluidic capacitor-filter-resistor circuit Another analyzer provided in accordance with aspects of the present disclosure includes an inner chassis, a housing surrounding the inner chassis, a drawer including a sample tube receptacle configured to retain a sample tube therein, a shucker assembly, and a robot assembly. The drawer is disposed within the housing and at least partially removable therefrom. The shucker assembly is disposed within the housing and includes a shucker body defining a cam surface and having a sample tube retainer. The shucker body is pivotably coupled to the inner chassis and pivotable relative thereto between a retracted position and a use position. The robot assembly is mounted on the inner chassis and includes a fixed frame, a y-axis body operably coupled to the fixed frame and movable relative thereto in a y-direction, and a carrier operably coupled to the y-axis body. The y-axis body includes a leg extending therefrom defining a foot at a free end of the leg. The carrier is movable with the y-axis body in the y-direction and movable relative to the y-axis body along the leg thereof in a z-direction. Movement of the y-axis body in the y-direction towards vertical registration with a sample tube retained within the sample receptacle urges the foot into contact with the cam surface to thereby pivot the shucker body from the retracted position to the use position wherein the sample tube retainer clamps and centers the sample tube relative thereto.

In an aspect of the present disclosure, the carrier supports a sample probe therein and is configured to move the sample probe in the y-direction into vertical registration with the sample tube and in the z-direction into the sample tube to aspirate sample therefrom. The carrier may further support a dilution probe in fixed orientation relative to the sample probe.

In another aspect of the present disclosure, the robot assembly further includes y-axis and z-axis potentiometers configured to enable feedback-based control of movement of the carrier in each of the y-direction and the z-direction.

In yet another aspect of the present disclosure, the robot assembly further includes a y-axis lead screw motor assembly including a motor, a lead screw operably coupled to the motor, and a nut threadingly engaged about the lead screw. The nut is engaged with the y-axis body such that activation of the motor rotates the lead screw to translate the nut and the y-axis body in the y-direction. Additionally or alternatively, the robot assembly further includes a z-axis lead screw motor assembly including a motor, a lead screw operably coupled to the motor, and a nut threadingly engaged about the lead screw. The nut is engaged with the carrier such that activation of the motor rotates the lead screw to translate the carrier in the z-direction In still another aspect of the present disclosure, the analyzer further includes a camera configured to recognize a type of sample tube retained within the sample tube receptacle. The robot assembly is configured to control at least one of the y-direction movement or the z-direction movement based on the identified type of sample tube.

A filter holder and ejector system for use with an analyzer or other suitable device is provided in accordance with the present disclosure and includes a base, a bottom cup, a top cap, and a handle. The base defines a top end portion, a bottom end portion, a front side, and a rear side, and is configured to receive a filter having a filter body, an inlet fitting, and an outlet fitting. The bottom cup is disposed at the bottom end portion of the base, defines an outlet, and includes a first gasket disposed therein. The bottom cup is configured to receive at least a portion of the outlet fitting of the filter. The top cap is movably supported towards the top end portion of the base, defines an inlet, and includes a second gasket disposed therein. The handle is pivotably coupled to the base and operably coupled with the top cap. The handle is pivotable relative to the base from a neutral position to an engaged position to urge the top cap about at least a portion of the inlet fitting of the filter such that the first gasket establishes a seal about an interface between the outlet fitting of the filter and the outlet of the bottom cup and such that the second gasket establishes a seal about an interface between the inlet fitting of the filter and the inlet of the top cap.

In an aspect of the present disclosure, the filter holder and ejector system further includes a clip disposed between the top and bottom end portions of the base and extending from a front side of the base. The clip is configured to engage the body of the filter therein. In such aspects, a rear bracket pivotably coupled to the rear side of the base about a pivot may be provided. The rear bracket includes at least one foot positioned such that pivoting of the rear bracket relative to the base about the pivot extends the at least one foot through a window defined with the base. The at least one foot is configured to contact and dislodge the body of the filter from engagement with the clip upon extension of the at least one foot through the window.

In another aspect of the present disclosure, the rear bracket further includes at least one cam lobe disposed on an opposite side of the pivot as compared to the at least one foot such that the at least one foot is extended through the window in response to urging of the at least one cam lobe in an opposite direction.

In yet another aspect of the present disclosure, the handle is operably positioned relative to the at least one cam lobe and further pivotable from the neutral position to an eject position. Movement of the handle from the neutral position to the eject position urges the at least one cam lobe in the opposite direction to thereby pivot the rear bracket such that the at least one foot is extended through the window.

In still another aspect of the present disclosure, the handle is coupled to the top cap via at least one linkage.

A hemoglobin detection cell for use in determining a hemoglobin concentration in a blood sample, e.g., within an analyzer, separate device, or stand-alone, is also provided in accordance with aspects of the present disclosure. The hemoglobin detection cell includes first and second pieces each including a body, a cut-out, a block, and a fitting. The body defines an upper surface and has a first end portion and a second end portion. A channel extends along the upper surface. The cut-out is defined within the body at the first end portion thereof while the block is complementary to the cut-out and disposed on the upper surface of the body at the second end portion of the body. The block defines a channel that cooperates with a portion of the channel of the body to define an enclosed lumen segment. A fitting extends from an end face of the body at the second end portion of the body and defines an internal passage in communication with the enclosed lumen segment. The second piece is inverted, oppositely oriented, and disposed on the first piece such that the upper surfaces abut one another, such that the cut-outs receive the blocks to define a generally rectangular body, and such that a continuous lumen extend between the internal passages of the fittings.

In an aspect of the present disclosure, the first and second pieces are secured to one another, e.g., via laser welding.

In another aspect of the present disclosure, the first and second pieces are formed from a plastic, e.g., acrylic.

In still another aspect of the present disclosure, the cut-outs and the blocks define complementary angled surfaces.

A debris trap of an analyzer includes a first disc body, a second disc body, and a filter screen. The first disc body includes an inlet fitting, defines a first cavity, and includes a first annular surface surrounding the first cavity. The first cavity defines an at least partially angled floor such that a depth of the first cavity decreases in a diametric direction from a first position adjacent the inlet fitting to a second position spaced-apart from the inlet fitting. The second disc body is engaged to the first disc body to define a disc housing, includes an outlet inlet fitting, defines a second cavity, and includes a second annular surface surrounding the second cavity. The filter screen is disposed between the first and second disc bodies and separates the first and second cavities.

In an aspect of the present disclosure, the first and second disc bodies are configured to engage one another with an annular periphery of the filter screen retained between the first and second annular surfaces of the first and second disc bodies, respectively.

In another aspect of the present disclosure, the first and second disc bodies are secured to one another via ultrasonic welding.

In still another aspect of the present disclosure, the inlet fitting and the outlet fitting are disposed at substantially diametrically opposed positions relative to the disc housing.

In yet another aspect of the present disclosure, the second cavity defines a substantially uniform depth in a diametric direction from a third position adjacent the outlet fitting to a fourth position spaced-apart from the outlet fitting.

A coupler for coupling tubing to a fitting within, for example, an analyzer, is provided in accordance with the present disclosure. The coupler includes a body including first and second open ends and a lumen extending between the first and second open ends. The lumen tapers in diameter from the first open end of the body inwardly to a first internal position within the body, and from the second open end of the body inwardly to a second internal position within the body. The tapers of the lumen are configured to facilitate press-fit engagement of one of tubing or a fitting into the lumen through each of the first and second open ends of the body.

In an aspect of the present disclosure, the body further includes a first flared end portion surrounding the lumen at the first open end that is configured to facilitate insertion and centering of the one of the tubing or the fitting into the lumen. Additionally or alternatively, the body further includes a second flared end portion surrounding the lumen at the second open end configured to facilitate insertion and centering of the one of the tubing or the fitting into the lumen.

In another aspect of the present disclosure, the body defines an elbow and wherein the internal lumen substantially conforms to the elbow. Alternatively, the body extends substantially linearly.

Another analyzer provided in accordance with the present disclosure includes an inner chassis, a housing surrounding the inner chassis, a sample tube receptacle positionable within the housing and configured to retain a sample tube therein, and a robot assembly mounted on the inner chassis. The robot assembly includes a fixed frame, a y-axis body operably coupled to the fixed frame and movable relative thereto in a y-direction, and a carrier operably coupled to the y-axis body. The carrier is movable with the y-axis body in the y-direction and supports a sample probe and a dilution probe thereon in fixed position and orientation relative to one another.

In an aspect of the present disclosure, the y-axis body includes a leg extending therefrom and the carrier is movable relative to the y-axis body along the leg thereof in a z-direction.

In another aspect of the present disclosure, the carrier is configured to move in the y-direction to bring the sample probe into vertical registration with the sample tube and in the z-direction to move the sample probe into the sample tube to aspirate sample therefrom.

In still another aspect of the present disclosure, the analyzer includes a plurality of mixing chambers disposed within the housing and mounted on the inner chassis. In a first action, the carrier is configured to move in the y-direction to bring the sample probe into vertical registration with one of the mixing chambers and in the z-direction to move the sample probe into the one of the mixing chambers. In a second action, the carrier is configured to move in the y-direction to bring the dilution probe into vertical registration with one of the mixing chambers and in the z-direction to move the dilution probe into the one of the mixing chambers.

In yet another aspect of the present disclosure, the robot assembly further includes at least one of a y-axis potentiometer or a z-axis potentiometer configured to enable feedback-based control of movement of the carrier in the y-direction or the z-direction, respectively.

In still yet another aspect of the present disclosure, the analyzer further includes at least one of a y-axis lead screw motor assembly configured to move the carrier in the y-direction or a z-axis lead screw motor assembly configured to move the carrier in the z-direction.

BRIEF DESCRIPTION OF THE DRAWINGS

Various aspects and features of the present disclosure are described hereinbelow with reference to the drawings wherein:

FIG. 10 is a perspective view of tubing including different types of couplers attached to opposed ends thereof;

FIG. 11 is a perspective view of tubing including similar couplers attached to opposed ends thereof;

FIG. 12 is a cross-sectional view taken across section line "12-12" of FIG. 10;

FIGS. 16 and 17 are respective front and side, perspective views of one of the syringe pumps of the hematology analyzer of FIG. 1;

DETAILED DESCRIPTION

Figure 1:
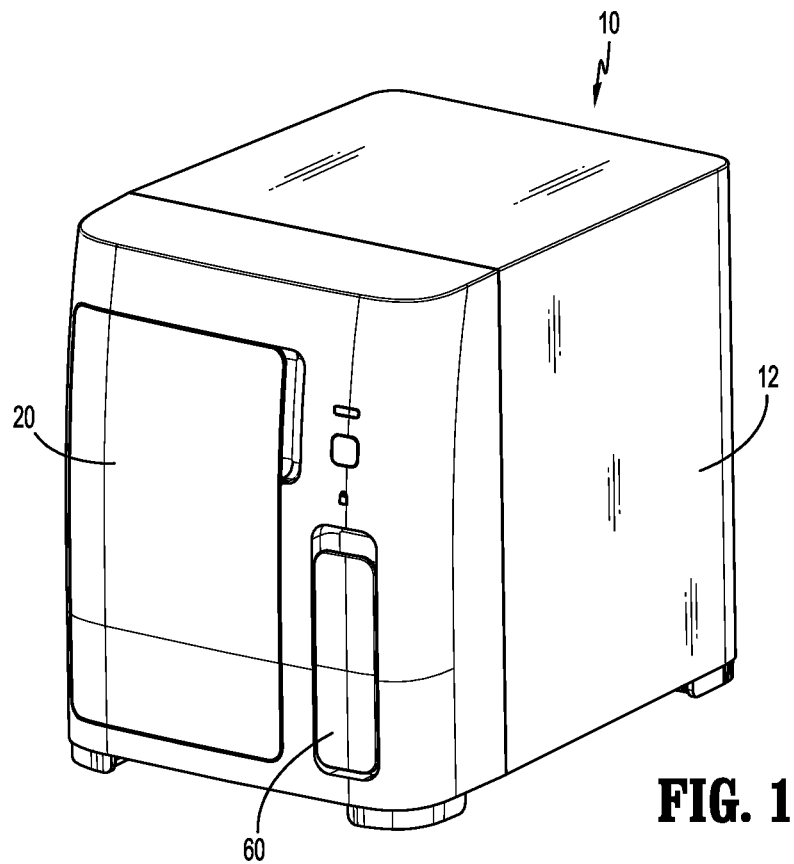
FIG. 1 is a front perspective view of hematology analyzer provided in accordance with the present disclosure.
Figure 2:
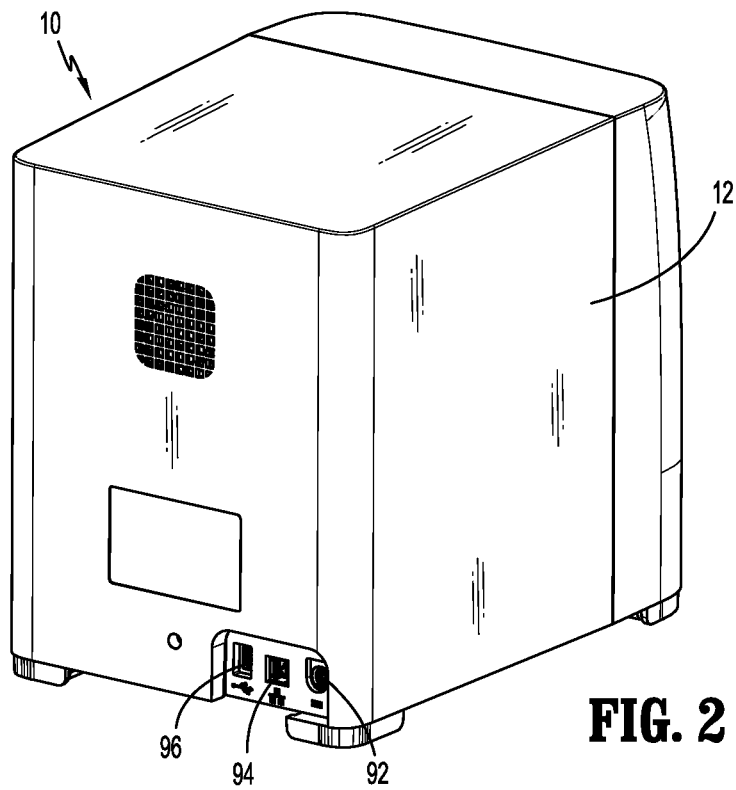
FIG. 2 is rear perspective view of the hematology analyzer of FIG. 1.
Figure 3:
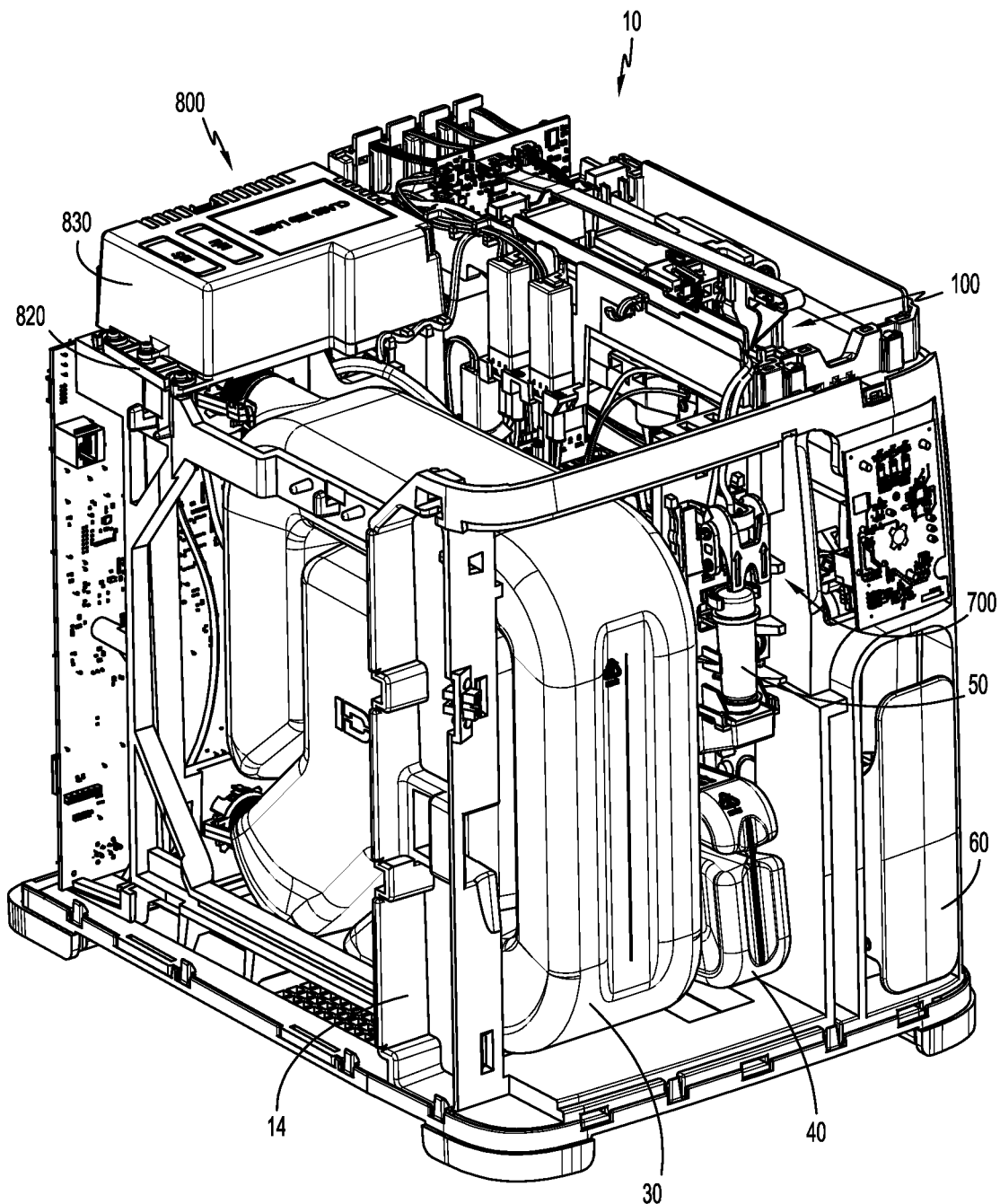
FIG. 3 is a front perspective view of the hematology analyzer of FIG. 1 with an outer housing removed.
Figure 4:
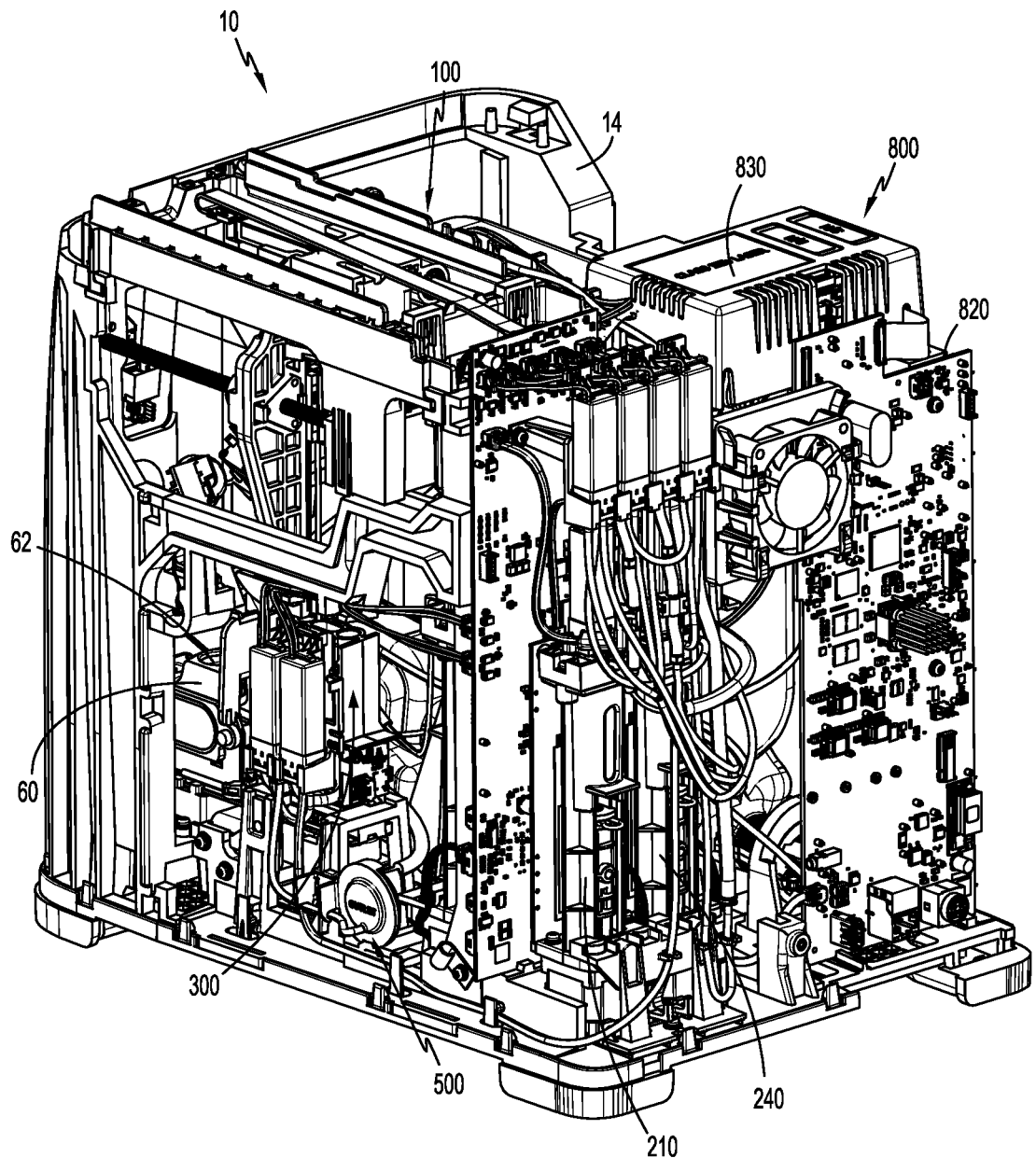
FIG. 4 is a rear perspective view of the hematology analyzer of FIG. 1 with the outer housing removed.
Figure 5:
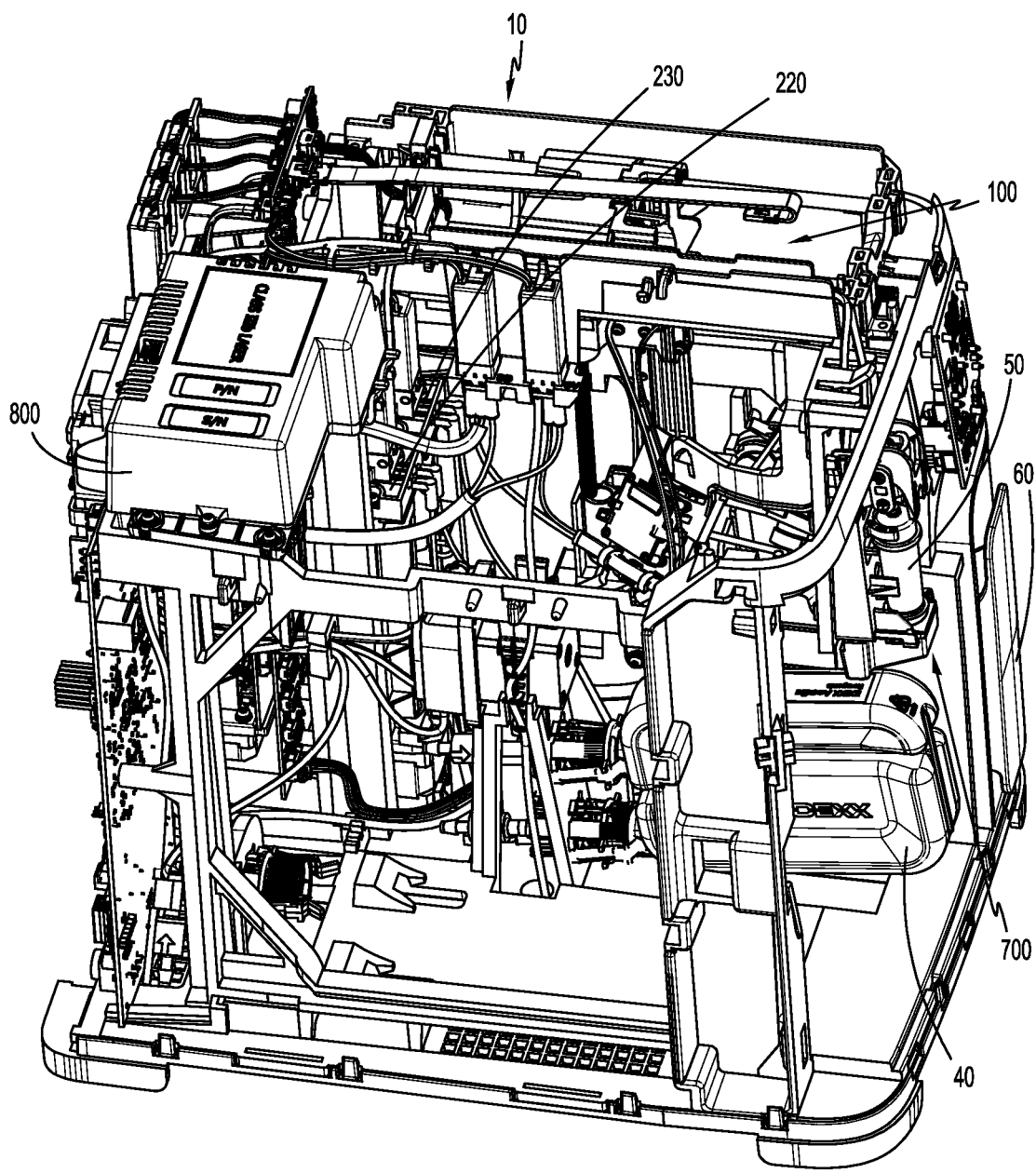
FIG. 5 is a side perspective view of the hematology analyzer of FIG. 1 with the outer housing and a sheath fluid and waste pack removed.

The present disclosure relates to a point-of-care medical diagnostic analyzer and devices, systems, and methods for medical diagnostic analysis of a sample. Although the aspects and features of the present disclosure are detailed herein with respect to a hematology analyzer including a flow cytometer for hematological analysis of a blood sample, e.g., for testing a sample of human or animal blood, the aspects and features of the present disclosure are equally applicable for use with other suitable analyzers, devices, systems, and methods, and with other diagnostic tools in place of or in addition to a flow cytometer.

Referring generally to FIGS. 1-8, a hematology analyzer incorporating a flow cytometer provided in accordance with the present disclosure is shown generally identified by reference numeral 10. Analyzer 10 includes an outer housing 12 and an inner chassis 14 which cooperate to enclose and support the internal working components of analyzer 10 therein. A door 20 hinged or otherwise operably coupled to inner chassis 14 provides selective access to the interior of outer housing 12 to enable insertion and removal of a sheath fluid and waste pack 30, a reagent pack 40, and a filter 50 therefrom. Any suitable sheath fluid and waste pack 30 and reagent pack 40 may be utilized such as, for example those detailed in Patent Application Pub. No. US 2019/0299213, titled "POINT-OF-CARE DIAGNOSTIC SYSTEMS AND CONTAINERS FOR SAME" and filed on Mar. 30, 2018, the entire contents of which are hereby incorporated herein by reference. A drawer 60 slidably or otherwise operably coupled to inner chassis 14 includes first and second receptacles 62, 64 that are selectively accessible via opening drawer 60 to enable insertion and removal of a sample tube 70 and an on-board control tube 80 from the respective receptacles 62, 64 (see FIG. 14B). First receptacle 62 is configured as a universal receptacle capable of retaining plural different types of sample tubes therein, e.g., 20+ different types of sample tubes, both capped and uncapped (see FIG. 14B). A plurality of ports such as, for example, a power port 92, a data port 94, and a peripheral device port 96, are accessible from the exterior of outer housing 12 to enable connection of a power cord, Ethernet cable, and peripheral device cable, respectively, to analyzer 10.

The internal working components of analyzer 10 include a robot assembly 100, four (4) syringe pumps 210-240, a mixing assembly 300, a peristaltic pump 400, a debris trap 500, a hemoglobin assembly 600, a filter holder and ejector assembly 700, and a flow cytometer assembly 800. Analyzer 10 also includes various tubing, valves, and associated connections fluidly coupling the above-noted internal working components with one another, sheath fluid and waste pack 30, reagent pack 40, filter 50, sample tube 70 (FIG. 14B), and/or on-board control tube 80 (FIG. 14B) to enable the selective establishment of the various fluid paths detailed hereinbelow. Further, various sensors, other electrical hardware, electrical connectors, and circuit boards are provided for operation and control of the functionality of analyzer 10 as also detailed hereinbelow.

Robot assembly 100 defines a dual-probe configuration having carrier 102 engaging a sample probe 110 and a dilution probe 120 in spaced-apart, fixed orientation relative to one another. Robot assembly 100 is configured to maneuver sample probe 110 to aspirate a sample from sample tube 70 when a sample run is initiated, deposit a first portion of the sample into a WBC chamber 310 of mixing assembly 300, deposit a second portion of the sample into an RBC chamber 320 of mixing assembly 300, and dip sample probe 110 into a cleaning chamber 330 of mixing assembly 300. When a control run is initiated, robot assembly 100 is configured to maneuver sample probe 110 to aspirate a control sample from on-board control tube 80, deposit a first portion of the control sample into WBC chamber 310 of mixing assembly 300, deposit a second portion of the control sample into RBC chamber 320 of mixing assembly 300, and dip sample probe 110 into cleaning chamber 330 of mixing assembly 300. Robot assembly 100 is further configured to maneuver dilution probe 120 to dip dilution probe 110 into cleaning chamber 330 of mixing assembly 300. Robot assembly 100 is described in greater detail below.

Figure 6:
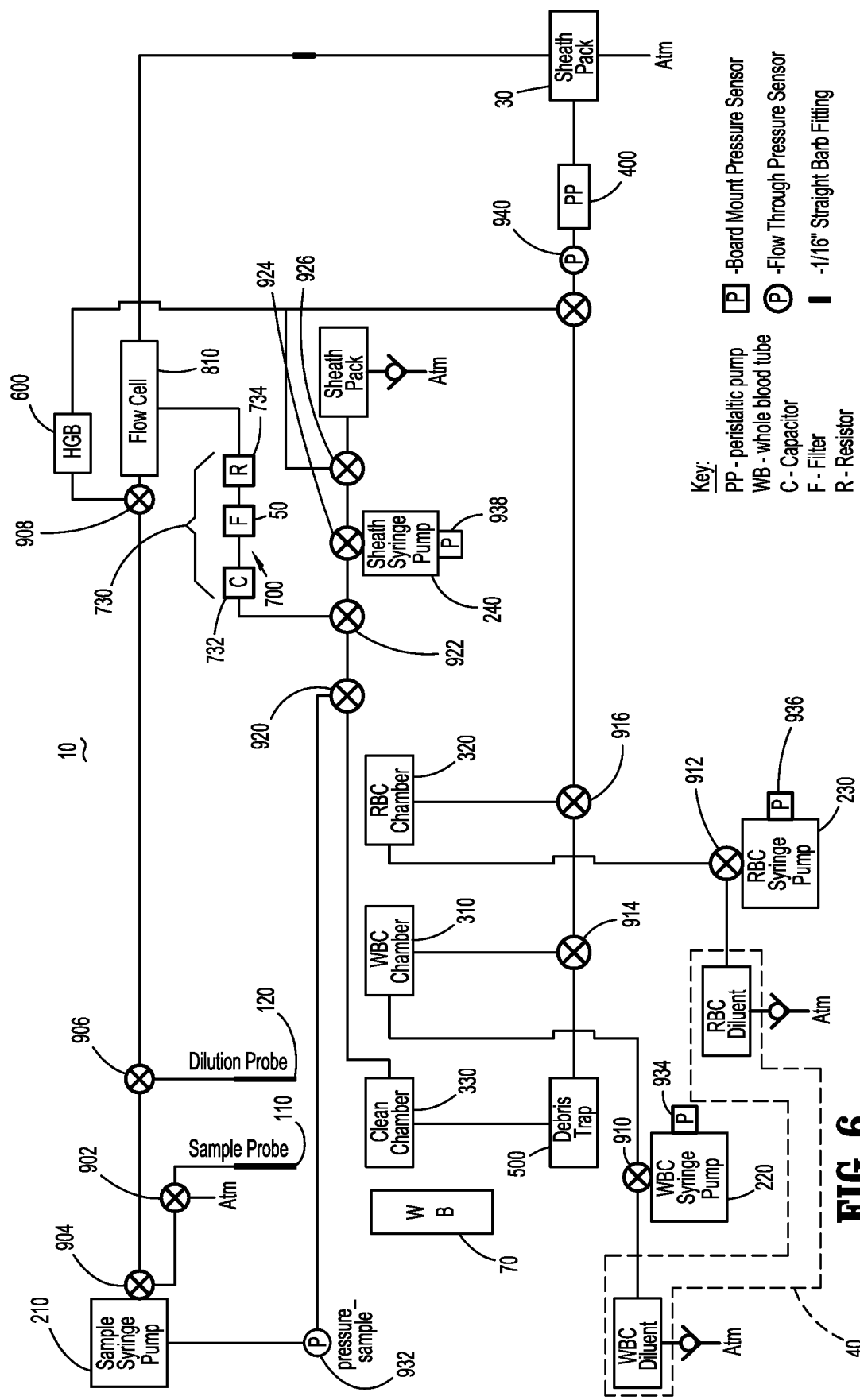
FIG. 6 is a schematic diagram of a fluidics system of the hematology analyzer of FIG. 1.
Figure 7:
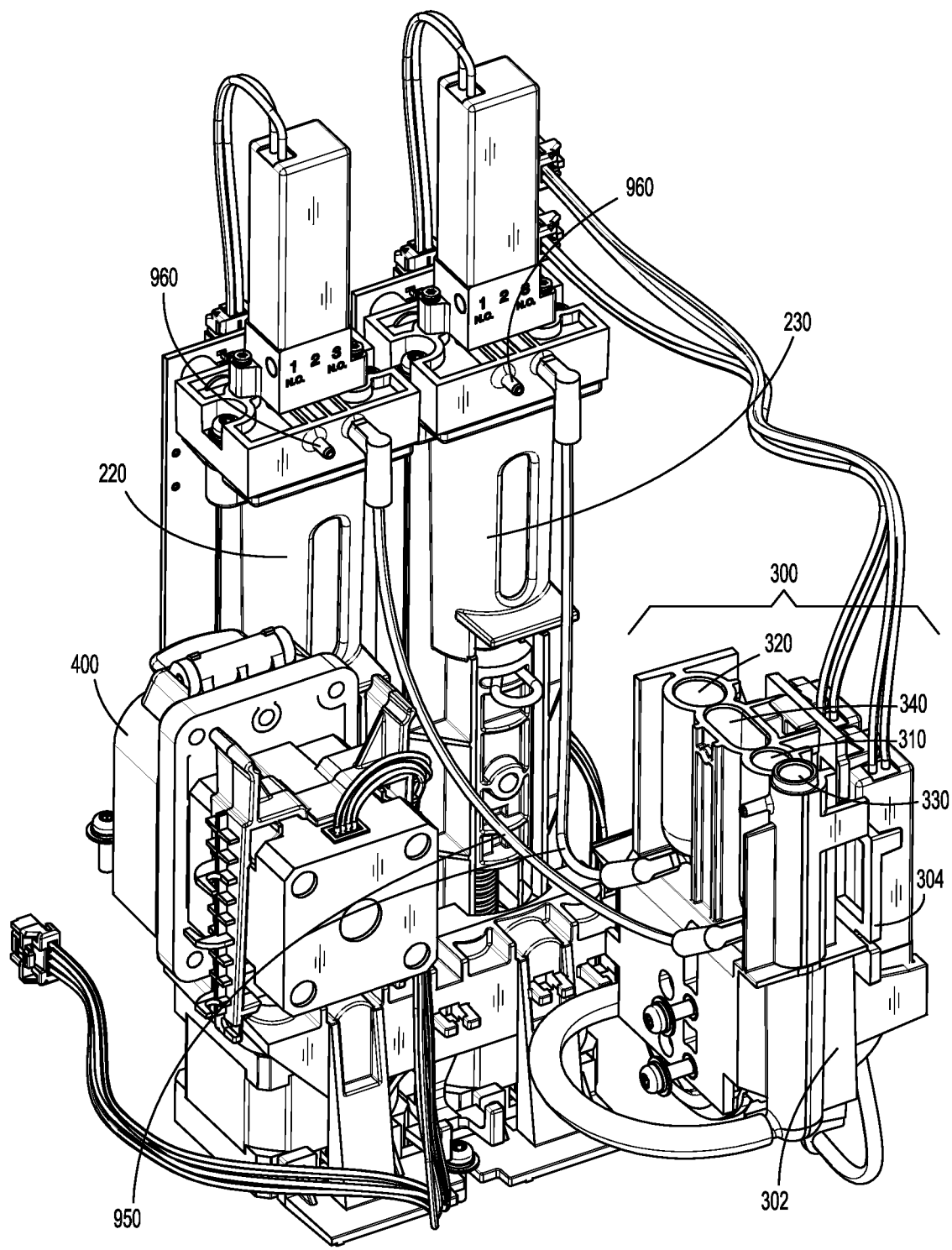
FIG. 7 is a first side perspective view of syringe pumps, a peristaltic pump, a mixing assembly, and associated tubing of the hematology analyzer of FIG. 1.
Figure 8:
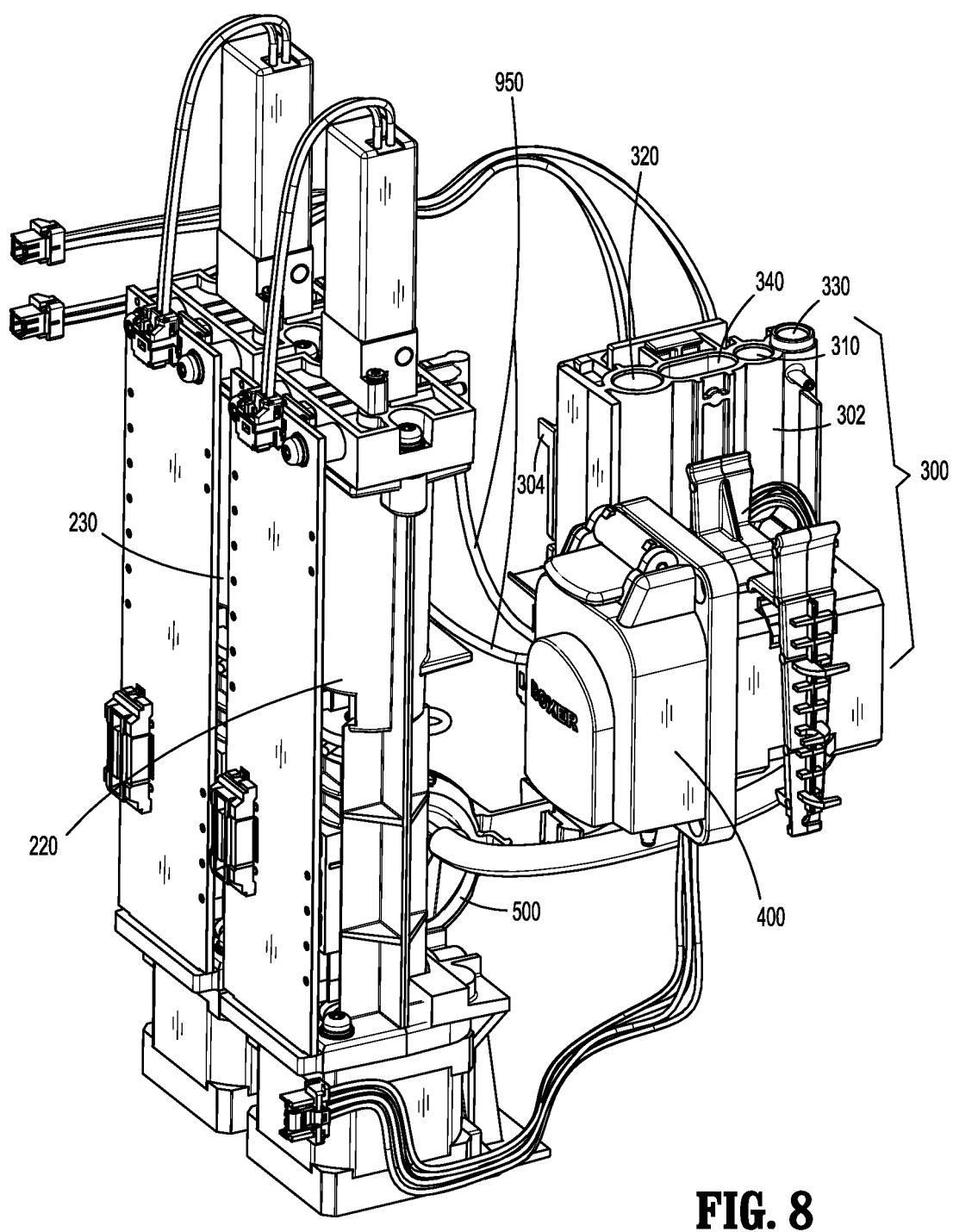
FIG. 8 is a second side perspective view of the syringe pumps, peristaltic pump, mixing assembly, and associated tubing of the hematology analyzer of FIG. 1.
Figure 9:
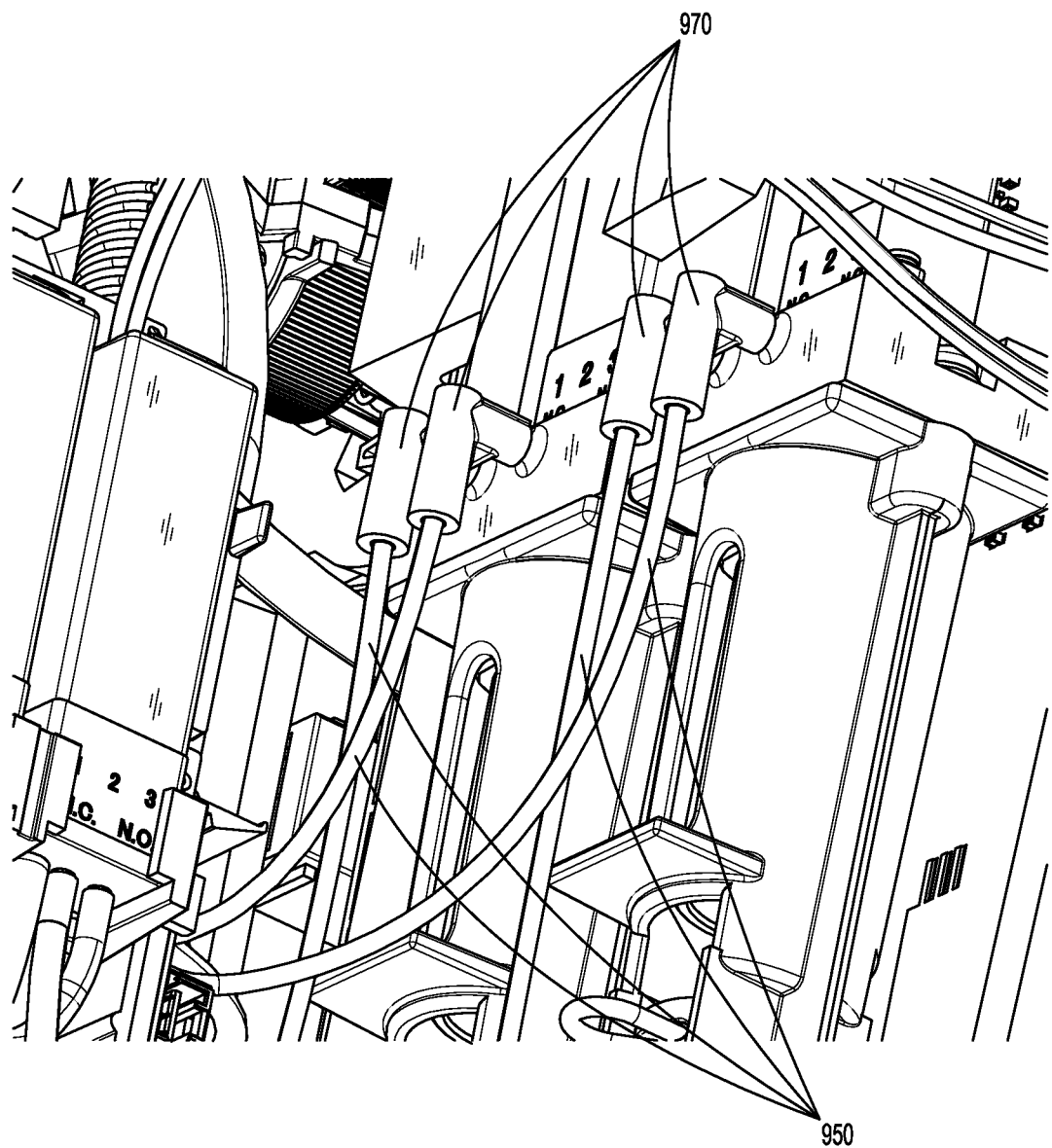
FIG. 9 is an enlarged perspective view of portions of the syringe pumps of FIG. 7 illustrating couplers connecting the associated tubing with the syringe pumps.
Figure 13A:
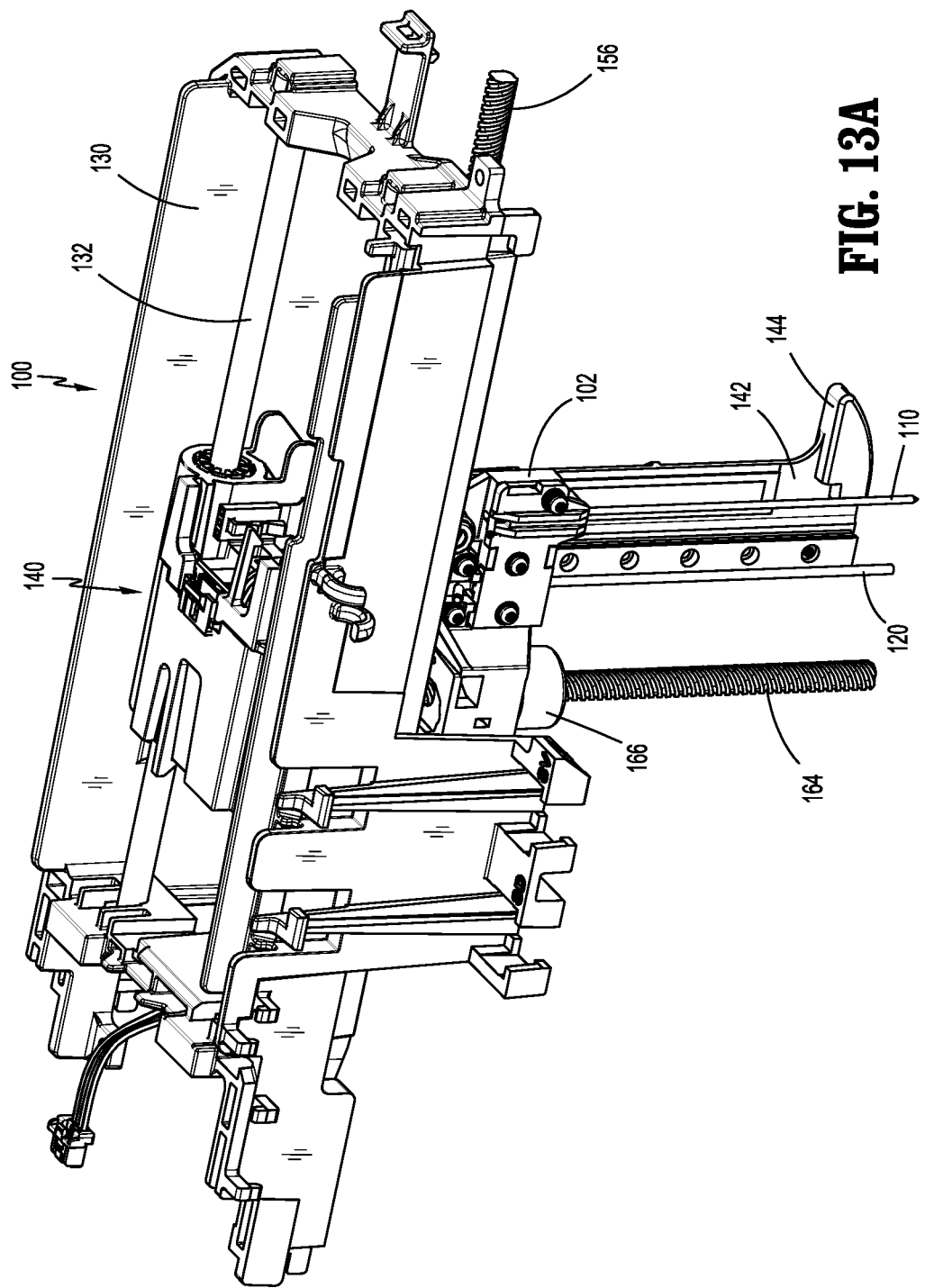
FIG. 13A is a top perspective view of a robot assembly of the hematology analyzer of FIG. 1.
Figure 13B:
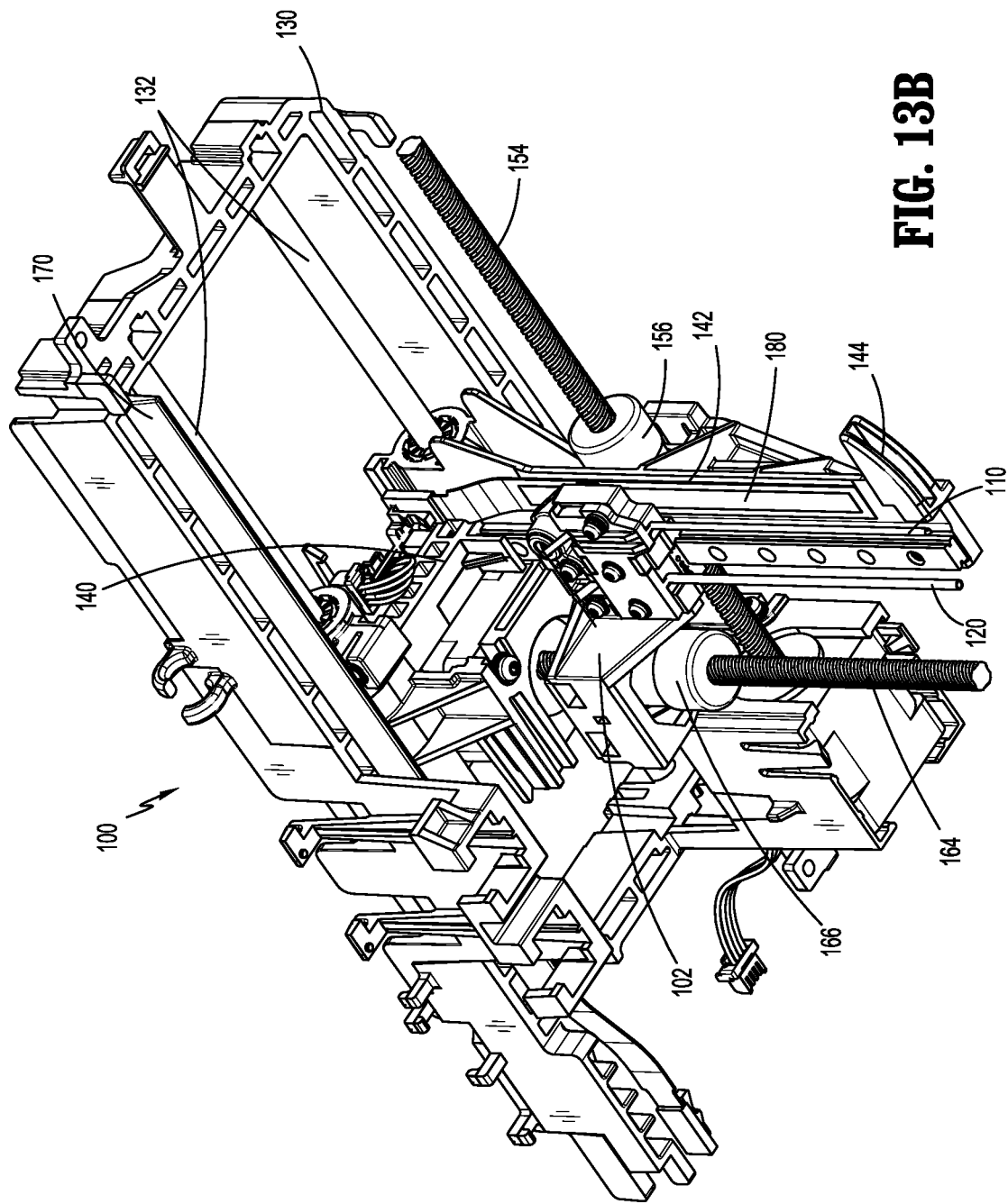
FIG. 13B is a bottom perspective view of the robot assembly of FIG. 13A.

Continuing with general reference to FIGS. 1-8, and with additional reference to FIG. 6, the four (4) syringe pumps include: a sample syringe pump 210, a WBC reagent syringe pump 220, an RBC reagent syringe pump 230, and a sheath syringe pump 240. Sample syringe pump 210 operably coupled to sample probe 110 and, more specifically, is configured to provide suction through sample probe 110 to aspirate the sample from sample tube 70 (FIG. 14B) (or the control sample from on-board control tube 80 (FIG. 14B)) into sample probe 110, to provide pressure through sample probe 110 to urge the first and second portions of the sample into WBC chamber 310 and RBC chamber 320, respectively, of mixing assembly 300, and to deliver sample-reagent mixtures to flow cell 810 of flow cytometer assembly 800. The WBC and RBC reagent syringe pumps 220, 230 are coupled between reagent pack 40 and WBC and RBC chambers 310, 320, respectively, of mixing assembly 300. More specifically, WBC and RBC reagent syringe pumps 220, 230 are configured to provide suction to aspirate reagent from reagent pack 40 and to provide pressure to urge the reagent into WBC and RBC chambers 310, 320, respectively, of mixing assembly 300. Sheath syringe pump 240 is operably coupled to sheath fluid and waste pack 30, sample probe 110, and a flow cell 810 of flow cytometer assembly 800. More specifically, sheath syringe pump 240 is configured to provide suction to draw sheath fluid from sheath fluid and waste pack 30, provide pressure to deliver sheath fluid to flow cell 810 of flow cytometer assembly 800, and provide pressure to deliver sheath fluid into cleaning chamber 330 of mixing assembly 300. Syringe pumps 210-240 are described in greater detail below.

Mixing assembly 300 of analyzer 10 includes a multi-chamber mixing housing 302 defining, as noted above, WBC chamber 310, RBC chamber 320, and cleaning chamber 330. Multi-chamber mixing housing 302 further defines a clearance cavity 340 positioned relative to WBC chamber 310, RBC chamber 320, and cleaning chamber 330 to enable operable interfacing of sample probe 110 and dilution probe 120 with one or more of chambers 310, 320, 330 without the other probe 110, 120 interfering with multi-chamber mixing housing 302. WBC and RBC reagent syringe pumps 220, 230 are mounted as part of mixing assembly 300, although other configurations are also contemplated. Mixing assembly 300 is described in greater detail below.

Peristaltic pump 400 is operably coupled to mixing assembly 300, sheath fluid and waste pack 30, and flow cell 810 of flow cytometer assembly 800, and dilution probe 120. Peristaltic pump 400, more specifically, is configured to aspirate fluid from the system and deposit it into sheath fluid and waste pack 30. More specifically, and for example, peristaltic pump 400 is configured to aspirate WBC chamber 310, RBC chamber 320, and cleaning chamber 330 of mixing assembly 300 for drainage of waste fluid to sheath fluid and waste pack 30, and to aspirate sample-reagent mixtures from WBC chamber 310 and RBC chamber 320 through dilution probe 120 to enable delivery to flow cell 810 of flow cytometer assembly 800 (via sample syringe pump 210).

Debris trap 500 of analyzer 10 is positioned in the fluid path between cleaning chamber 330 of mixing assembly 300 and sheath fluid and waste pack 30 to capture any debris flushed from cleaning chamber 330 as the waste fluid from cleaning chamber 330 is pumped to sheath fluid and waste pack 30. Debris trap 500 does not require replacement over the life of analyzer 10 but, rather, is configured to capture a lifetime worth of debris. Debris trap 500 is described in greater detail below.

Figure 25:
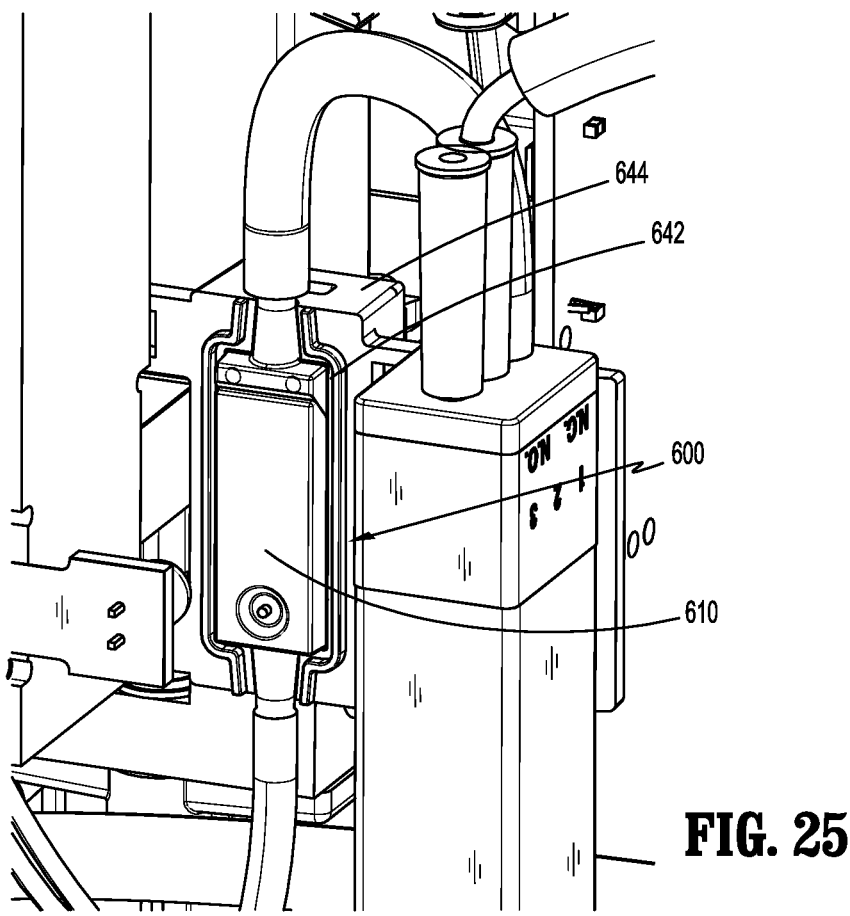
FIG. 25 is an enlarged perspective view of a portion of the hematology analyzer of FIG. 1, illustrating a hemoglobin detection cell of the analyzer.

Referring still to FIGS. 1-8, and with additional reference to FIG. 25, hemoglobin assembly 600 is mounted as part of flow cytometer assembly 800, may be mounted as part of another assembly, or may be separately mounted. Hemoglobin assembly 600 is disposed in parallel with flow cell 810 of flow cytometer assembly 800. Hemoglobin assembly 600 includes a hemoglobin detection cell 610, a light source (not shown), and a sensor (not shown). Hemoglobin detection cell 610 is operably coupled to WBC chamber 310 of mixing assembly 300 and peristaltic pump 400 to enable sample to be drawn from WBC chamber 310 through dilution probe 120 to hemoglobin detection cell 610, and ultimately to sheath fluid and waste pack 30. Pulling sample, e.g., a slug of lysed whole blood, through hemoglobin detection cell 610 frees the hemoglobin from the red blood cells. The slug of lysed whole blood passes through hemoglobin detection cell 610 wherein the light source and sensor enable absorption measurement at one or more separate wavelengths of light, in order to determine a hemoglobin concentration in the sample. Hemoglobin assembly 600 is described in greater detail below.

Referring again to FIGS. 1-8, filter holder and ejector assembly 700 releasably retains filter 50 therein. With filter 50 engaged within filter holder and ejector assembly 700, filter 50 is operably coupled between sheath syringe pump 240 and flow cell 810 of flow cytometer assembly 800. Filter 50, together with a fluidic capacitor 732 and a fluidic resistor 734 form a fluidic capacitor-filter-resistor circuit 730 through which the sheath fluid passes. This circuit 730 controls the flow of the sheath fluid, which surrounds the sample core stream as it passes through flow cell 810, thereby facilitating establishment of the core stream. Filter holder and ejector assembly 700 is described in greater detail below.

Flow cytometer assembly 800, as noted above, includes flow cell 810 which is configured to facilitate the flow of a sample core stream and surrounding sheath fluid therethrough. Flow cytometer assembly 800 further includes a mounting platform 820 to which a laser optics assembly (not shown), flow cell 810, and front and side-scatter sensor assemblies (not shown) are mounted, and an outer cover 830 disposed on the mounting platform 820 and enclosing the laser optics assembly, flow cell 810, and front and side-scatter sensor assemblies therein. Any suitable flow cytometer assembly 800 may be utilized such as, for example, the flow cytometer detailed in Patent Application Pub. No. US 2019/0302391, titled "FLOW CYTOMETER, LASER OPTICS ASSEMBLY THEREOF, AND METHODS OF ASSEMBLING THE SAME" and filed on Mar. 28, 2019, the entire contents of which are hereby incorporated herein by reference.

With particular reference to FIG. 6, as noted above, various tubing, valves, and associated connections fluidly couple the internal working components of analyzer 10 with one another, sheath fluid and waste pack 30, reagent pack 40, filter 50, sample tube 70, and/or on-board control tube 80 to enable the selective establishment of the various fluid paths. With respect to valves (which may be electrically-controlled solenoid valves or other suitable valves) disposed in the various fluid lines, more specifically: a sample vent valve 902 is disposed in the sample probe line between sample probe 110 and sample syringe pump 210; a sample flow cell valve 904 is disposed in the sample probe line between sample syringe pump 210 and sample vent valve 902; a dilution valve 906 is disposed in the dilution probe line between dilution probe 120, sample syringe pump 210, and flow cell 810; a flow cell valve 908 disposed at a branch in the sample line that splits between flow cell 810 and hemoglobin assembly 600; WBC and RBC mix valves 910, 912 are disposed at the outputs of WBC and RBC reagent syringe pumps 220, 230, respectively; WBC and RBC clean valves 914, 916 are disposed at the outputs of WBC and RBC chambers 310, 320, respectively, and in the drain line from cleaning chamber 330; a hemoglobin clean valve 918 connected in the outflow hemoglobin line; a sample clean valve 920 disposed in the fluid line connecting sample syringe pump 210 with clean chamber 330; a flow cell clean valve 922 is disposed in the output line of the sheath syringe pump 240 at a branch between the fluid line to flow cell 810 and the fluid line to cleaning chamber 330; a sheath flow cell valve 924 disposed at the output of sheath syringe pump 240; and a sheath hemoglobin valve 926 disposed between the sheath syringe pump 240 and hemoglobin assembly 600. The various fluid lines of analyzer 10 may share segments and/or operably interconnect by way of branches, valves, etc. with one or more other fluid lines. Further, although each specific fluid line and/or portion thereof of analyzer 10 may not be explicitly described herein, it is understood that where flow of fluid from one component to another component is detailed, a direct or indirect fluid line or portion thereof extends between the fluidly coupled components.

Continuing with reference to FIG. 6, pressure sensors 932, 934, 936, 938, and 940 are associated with the sample syringe pump 210, WBC reagent syringe pump 220, RBC reagent syringe pump 230, sheath syringe pump 240, and peristaltic pump 400, respectively, in order to provide feedback regarding pressures associated therewith. Pressure sensors 932 and 940 may be configured as flow-through pressure sensors while pressure sensors 934, 936, and 938 may be configured as board-mount pressure sensors, although other configurations are also contemplated. Fluidic capacitor-filter-resistor circuit 730 formed by filter 50, fluidic capacitor 732, and fluidic resistor 734, is provided in the sheath flow line between sheath syringe pump 240 and flow cell 810. With additional momentary reference to FIGS. 3-5, analyzer 10 includes various PCBA's, flex circuits, electrical connectors, and/or other circuitry mounting and/or interconnecting various electronics (hardware and/or implementing software) associated with analyzer 10 to enable powering, sensing, use, and/or control of the various components and assemblies of analyzer 10.

Turning to FIGS. 9-12, tubing 950 (and/or other conduits, channels, etc.) connects the various components of analyzer 10 detailed above to establish the various fluid lines between the various components. Tubing 950 may be formed from PTFE or other suitable material. In order to connect tubing 950 with fittings 960 (FIG. 7) associated with the various components of analyzer 10, couplers 970, 980 are provided. Couplers 970 are configured as elbow couplers and may define an elbow angle of about 90 degrees or other suitable elbow angle. Couplers 980 are configured as linear couplers, although other configurations are also contemplated. The different configurations of couplers 970, 980 enable connection to fittings 960 (FIG. 7) in various different orientations and/or with various different access clearances.

Each coupler 970 defines a body 972 including an internal lumen 974 and first and second open ends 976, 978, respectively, communicating with internal lumen 974. Internal lumen 974 defines an angled or curved configuration to substantially conform with the elbow configuration of coupler 970 and interconnect open ends 976, 978. Internal lumen 974 tapers in diameter from first and second open ends 976, 978 of body 972 inwardly through at least portions of internal lumen 974. Body 972 further includes flared end portions 977, 979 disposed at first and second open ends 976, 978, respectively, thereof and surrounding lumen 974. Flared end portions 977, 979 facilitate insertion and centering of an end portion of tubing 950 and a fitting 960 (FIG. 7), respectively, therein. First and second open ends 976, 978 of body 972 may be dedicated for receiving an end portion of tubing 950 and a fitting 960 (FIG. 7), respectively, vice versa, or may be universal to enable receipt of either. The tapered configuration of internal lumen 974 from first and second open ends 976, 978 of body 972 provides increasing press-fit engagement of an end portion of tubing 950 and a fitting 960 (FIG. 7), respectively, therein to ensure a secure engagement therebetween. Coupler 980 is configured similarly to coupler 970 except that coupler 980 defines a liner configuration rather than an elbowed configuration. Couplers 970, 980 advantageously enable quick, secure, and reliable connections via a push-to-connect assembly.

Referring to FIGS. 13A-15, robot assembly 100, as detailed above, includes a carrier 102 supporting thereon, in fixed position, sample probe 110 and dilution probe 120. Robot assembly 100 further includes a fixed frame 130, a y-axis body 140, a y-axis lead screw motor assembly 150, a z-axis lead screw motor assembly 160, a y-axis linear potentiometer 170, and a z-axis potentiometer 180. Fixed frame 130 is configured for fixed mounting to inner chassis 14 of analyzer 10 and includes a pair of spaced-apart support rails 132 engaged therein and extending along the y-axis. Support rails 132 slidably support y-axis body 140 thereon such that y-axis body 140 is confined to movement in the "y" direction relative to fixed frame 130. Y-axis potentiometer 170 is fixed relative to and extends along at least a portion of fixed frame 130 in the "y" direction.

Y-axis lead screw motor assembly 150 includes a motor 152 mounted on fixed frame 130, a lead screw 154 operably coupled to motor 152 and extending therefrom along the y-axis, and a nut 156 threadingly engaged about lead screw 154. Nut 156 is fixedly engaged with y-axis body 140 such that, upon activation of motor 152, lead screw 154 is driven to rotate to thereby translate nut 156 and, thus, y-axis body 140 left or right along the "y" direction (and along support rails 132) relative to fixed frame 130 depending upon the direction of activation of motor 152. Y-axis body 140 further includes a leg 142 depending therefrom that defines a foot 144 at a free end portion thereof. Z-axis potentiometer 180 is fixed relative to and extends along at least a portion of leg 142 in the "z" direction.

Z-axis lead screw motor assembly 160, is supported on y-axis body 140 and, more specifically, includes a motor 162 mounted on y-axis body 140, a lead screw 164 operably coupled to motor 162 and extending therefrom in the "z" direction, and a nut 166 threadingly engaged about lead screw 164. Carrier 102 is fixedly engaged with nut 166 such that, upon activation of motor 162, lead screw 164 is driven to rotate to thereby translate nut 166 and, thus, carrier 102 (including sample probe 110 and dilution probe 120) up or down in the "z" direction relative to y-axis body 140 depending upon the direction of activation of motor 162. Z-axis lead screw motor assembly 160 and carrier 102 are coupled to y-axis body 140 in fixed position with respect to the y-axis such that z-axis lead screw motor assembly 160 and carrier 102 are translated in the "y" direction in response to translation of y-axis body 140 along the y-axis. However, carrier 102 is configured to translate in the "z" direction relative to y-axis body 140, e.g., in response to activation of motor 162.

As a result of the above-detailed configuration, motors 152, 162 enable carrier 102 (including sample probe 110 and dilution probe 120) to move left or right in the "y" direction and up or down in the "z" direction to maneuver sample probe 110 and dilution probe 120 into their various operable positions, as detailed below. Y-axis and z-axis potentiometers 170, 180, respectively, encode "y" direction and "z" direction positions, respectively, during the above-noted movement, to provide feedback that enables determination of the position of sample probe 110 and dilution probe 120 such that accurate movement and positioning thereof is achieved. Positional and/or impedance-based feedback may be utilized to precisely control movement of probes 110, 120 using potentiometers 170, 180.

Figure 14A:
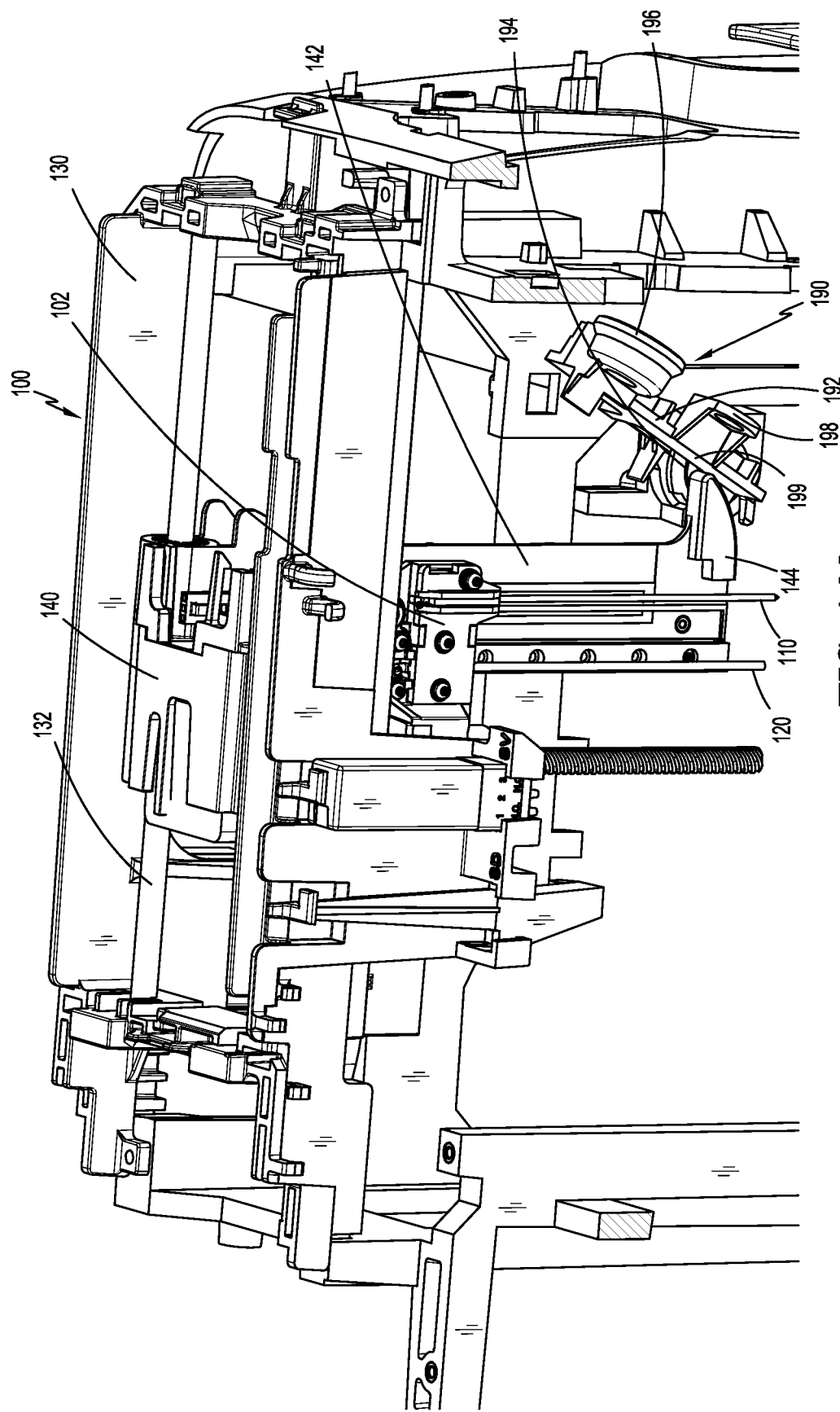
FIG. 14A is a perspective view of a portion of the hematology analyzer of FIG. 1 with the outer housing removed, illustrating the robot assembly of FIG. 13A in a first position with a shucker body thereof disposed in a storage position.
Figure 14B:
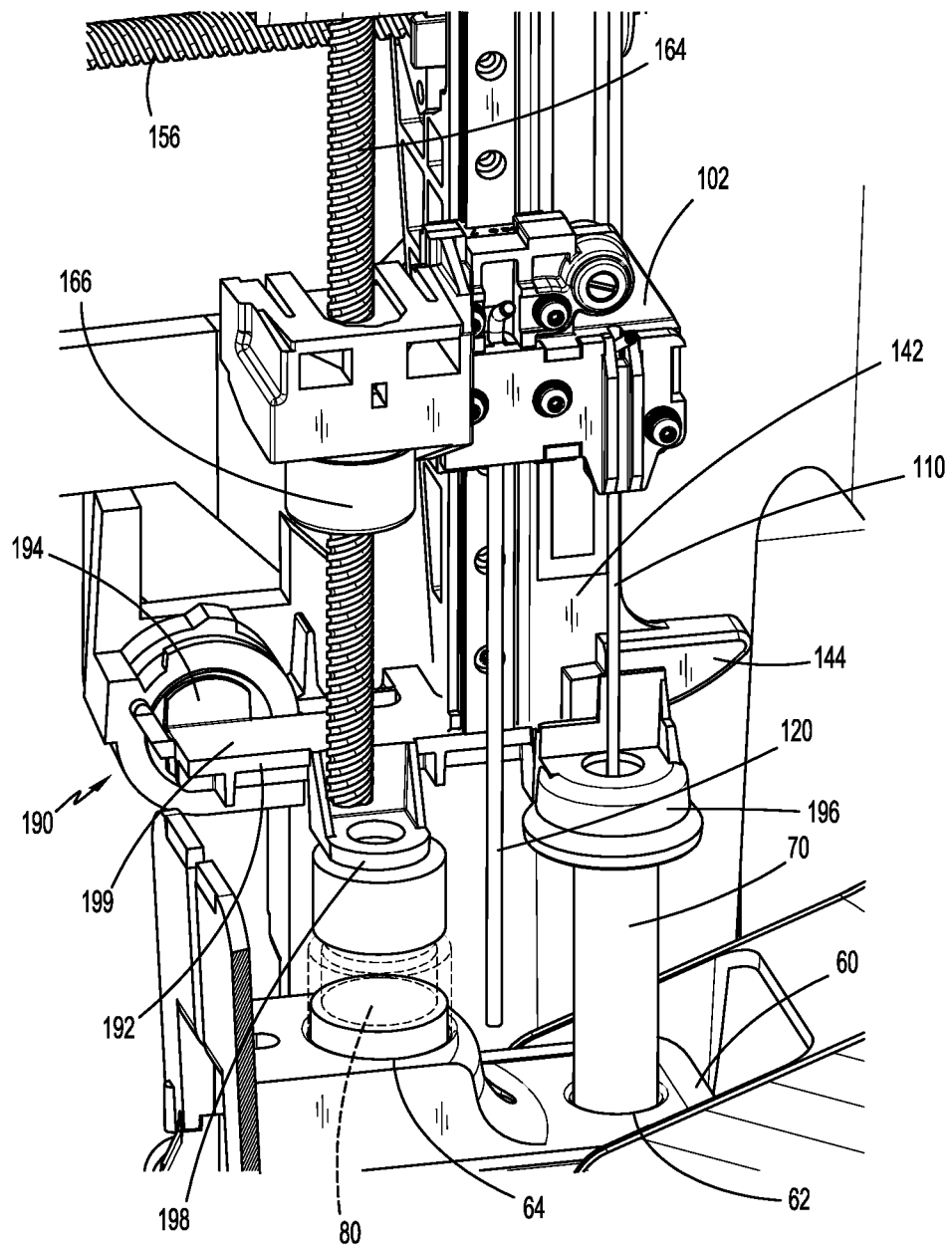
FIG. 14B is a perspective view of a portion of the hematology analyzer of FIG. 1 with the robot assembly of FIG. 13A in a second position and the shucker body thereof in a use position.
Figure 15:
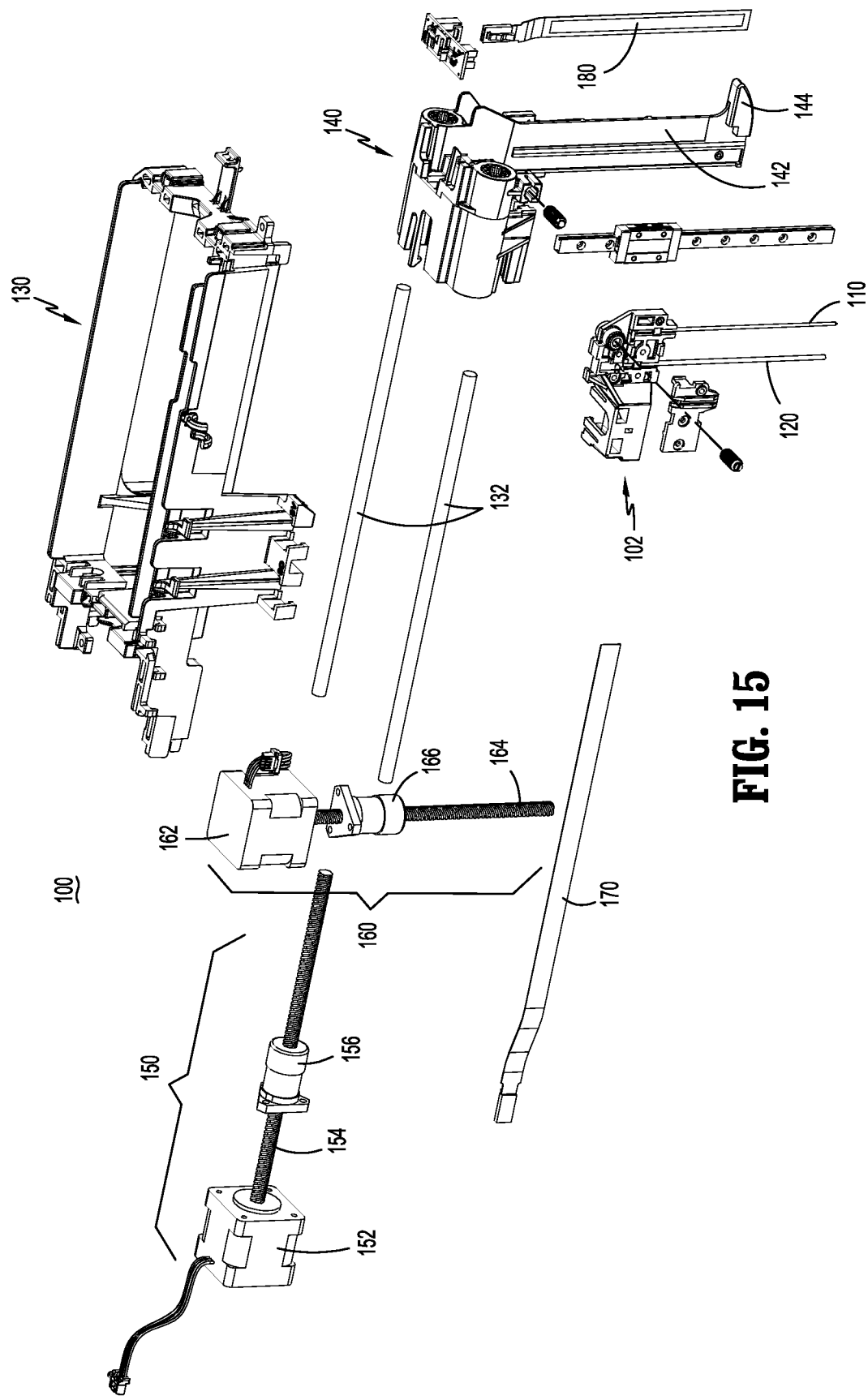
FIG. 15 is an exploded perspective view of the robot assembly of FIG. 13A.

Referring in particular to FIGS. 14A and 14B, chassis 14 of analyzer 10 pivotably supports a shucker assembly 190 thereon. Shucker assembly 190 includes a shucker body 192 that is pivotably coupled to chassis 14 about a pivot 194 to enable pivoting of shucker body 192 between a retracted position (FIG. 14A) and a use position (FIG. 14B). In embodiments, shucker body 192 is biased towards the retracted position.

Shucker body 192 defines sample tube retainer 196, a control tube retainer 198, and a cam surface 199. Sample tube retainer 196 and control tube retainer 198 are configured, in the use position, to clamp onto and center sample tube 70 and control tube 80, respectively, therein. Cam surface 199 is disposed in the travel path of foot 144 of leg 142 of y-axis body 140 of robot assembly 100 along the y-axis thereof such that as y-axis body 140 is moved in the "y" direction towards sample tube 70 for aspirating sample therefrom, foot 144 contacts cam surface 199 and cams therealong to thereby pivot shucker body 192 from the retracted position to the use position.

Sample tube retainer 196 is configured as a universal retainer capable of clamping onto and centering plural different types of sample tubes therein, e.g., 20+ different types of sample tubes, both capped and uncapped. Further, a camera, bar code reader, and/or other suitable sensor may be incorporated into robot assembly 100 (or otherwise within analyzer 10) to enable the detection of a type and/or classification of the sample tube from a plurality (e.g., 20+ different types and/or classifications) of sample tubes. Additionally or alternatively, measurements, assumptions, etc. of unidentifiable sample tubes may be obtained by the sensor(s). Based upon the identified sample tube or other obtained information, a database or other suitable data storage file storing setting information can be accessed to, for example, facilitate the use and control of robot assembly 100 based upon, e.g., one or more of whether a cap is utilized, dimensions (height and diameter) of the sample tube, a volume of the sample tube, curvature of a bottom of the sample tube, etc. Default setting information and/or reliance or more reliance upon feedback-based control may be utilized in instances where the sample tube is not readily identifiable.

Figure 18:
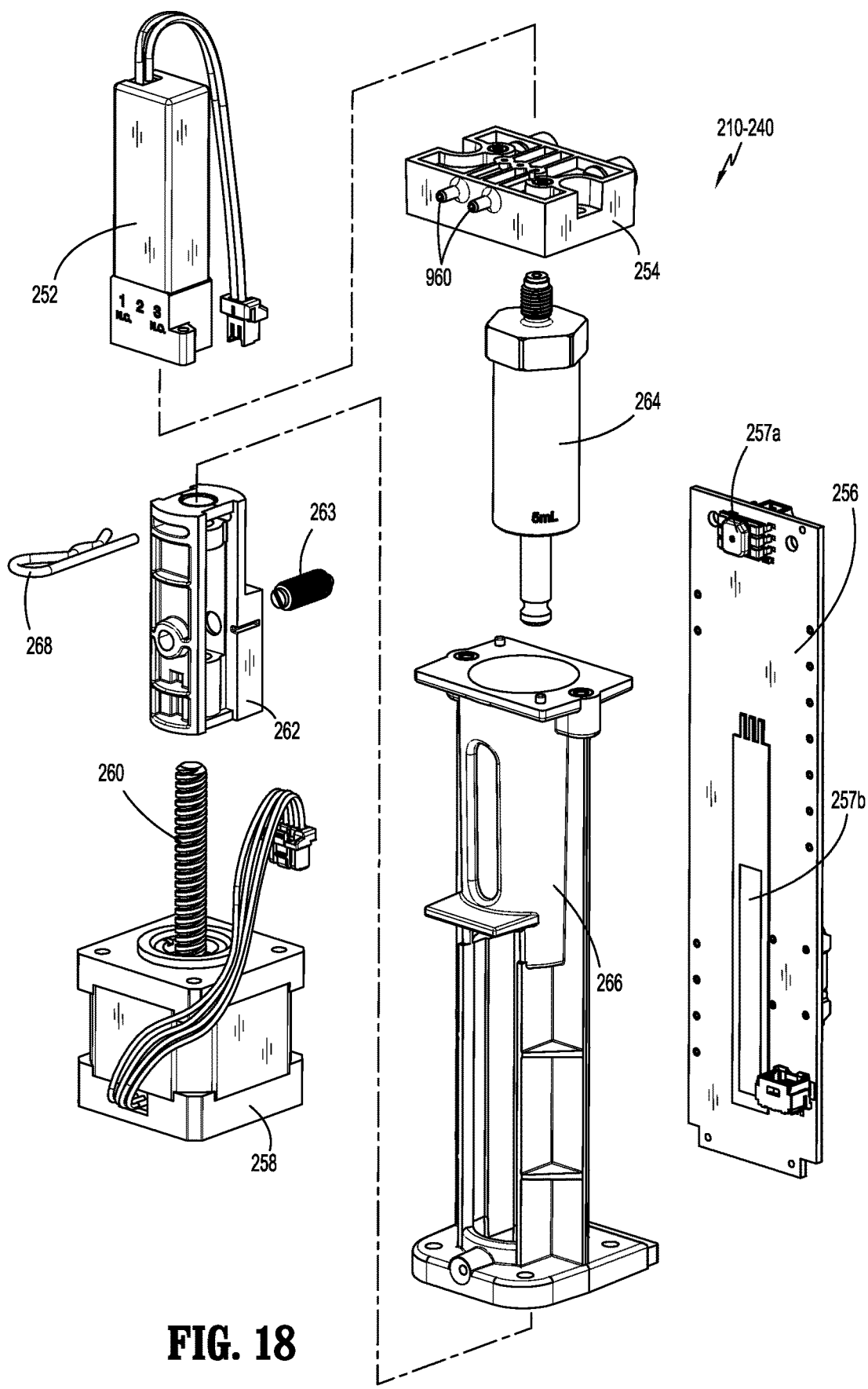
FIG. 18 is an exploded perspective view of the syringe pump of FIGS. 16 and 17.
Figure 20:
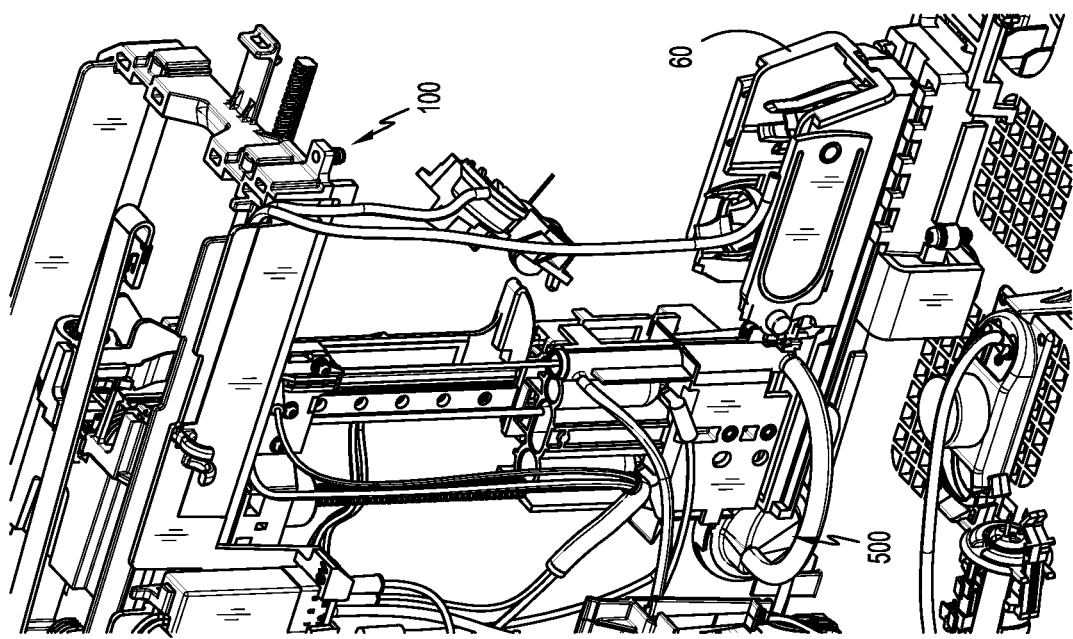
FIGS. 19 and 20 are enlarged, respective exterior and interior perspective views of a portion of the hematology analyzer of FIG. 1, illustrating a debris trap of the analyzer.
Figure 19:
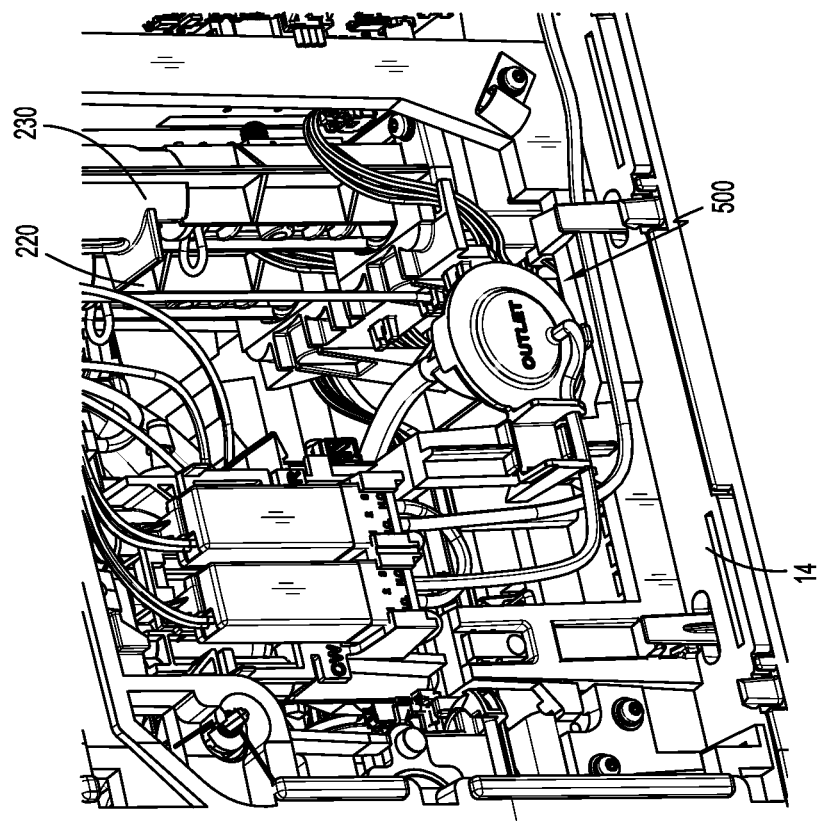
Figures 21, 22:
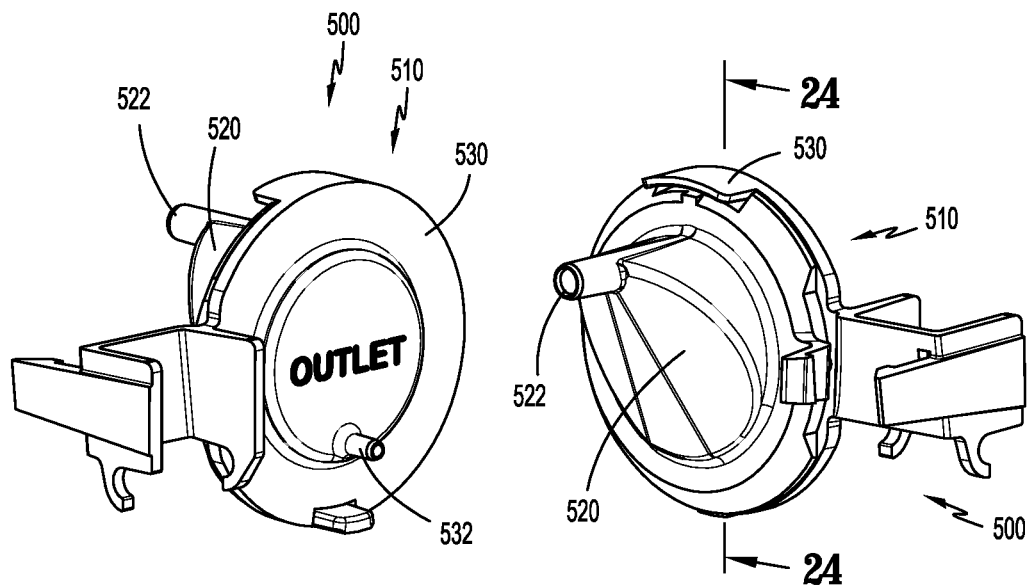
FIGS. 21 and 22 are respective front and rear perspective views of the debris trap of FIGS. 19 and 20.
Figure 23:
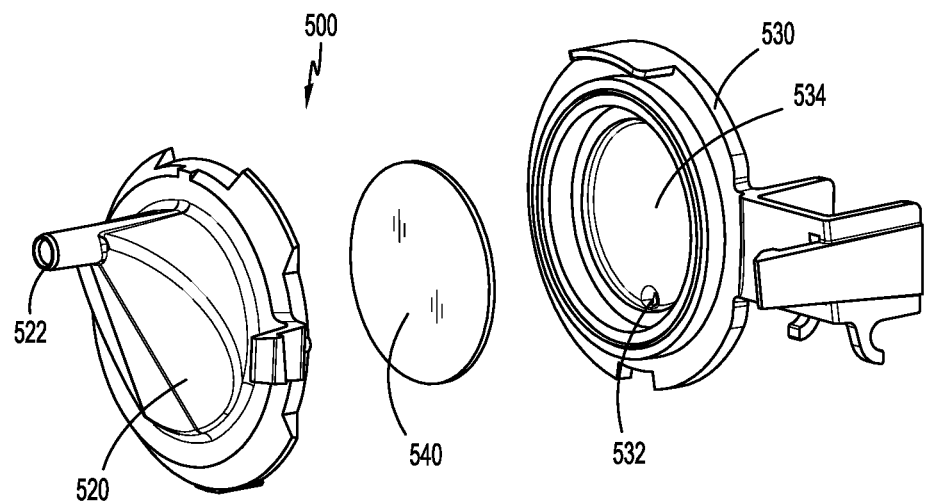
FIG. 23 is an exploded perspective view of the debris trap of FIGS. 19 and 20.
Figure 24:
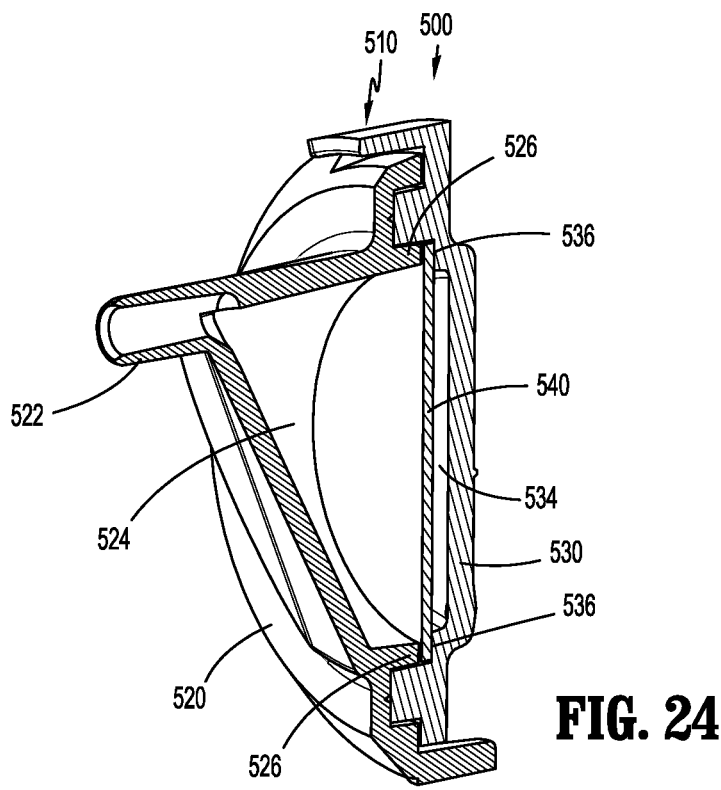
FIG. 24 is a cross-sectional view taken across section line "24-24" of FIG. 22.

With reference to FIGS. 16-18, syringe pumps 210-240 are substantially similar to one another except as detailed below and with respect to capacity, e.g., sample syringe pump 210 may include a 250 µL syringe and manifold while the other syringe pumps 220-240 may include 5 mL syringes and manifolds, although other configurations are also contemplated. Syringe pumps 210-240 are configured to aspirate and dispense fluid and to provide positional and pressure feedback to enable accurate control thereof. Each syringe pump 210-240 includes a solenoid valve 252, a manifold 254, a PCBA 256, a stepper motor 258, a lead screw 260, a travel nut 262, a syringe 264, a pump base 266, and a hitch pin 268. Lead screw 260 is operably engaged with and extends from stepper motor 258 and includes travel nut 262 threadingly engaged thereon. A plunger of syringe 264 is seated on travel nut 262 and engaged therewith via hitch pin 268 while a body of syringe 264 is fixed relative to pump base 266. Pump base 266 is supported on stepper motor 258 and receives lead screw 260, travel nut 262, and syringe 264 therein. Thus, activation of stepper motor 258 drives rotation of lead screw 260 to thereby translate travel nut 262 through pump base 266 and, in turn, slide the plunger of syringe 264 through the body thereof to dispense or draw fluid, depending upon the direction of travel. Manifold 254 is supported on an end of pump base 266 opposite stepper motor 258, supports solenoid valve 252 thereon, and is configured to direct fluid dispensed from syringe 264 into solenoid valve 252 for dispensing from a desired port. PCBA 256 extends along an exterior of pump base 266 and, in at least some syringe pumps 210-240, includes a pressure sensor 257a mounted thereon to provide feedback as to a pump pressure within syringe 264. A linear potentiometer 257b may be disposed on and extend along at least a portion of a length of PCBA 256 to enable determination of a position of travel nut 262 (based on a potentiometer wiper 263 associated with travel nut 262) and, thus, to enable determination of a state of deployment of the syringe pump 210-240. Fittings 960 associated with manifold 254 enables connection of tubing 950 thereto for inflow and outflow of fluid from syringe pumps 210-240.

FIGS. 19-24 illustrate debris trap 500 of analyzer 10. As noted above, debris trap 500 is positioned in the fluid path between cleaning chamber 330 of mixing assembly 300 and sheath fluid and waste pack 30 to capture any debris flushed from cleaning chamber 330 as the waste fluid from cleaning chamber 330 is pumped to sheath fluid and waste pack 30. Debris trap 500 is configured to capture a lifetime worth of debris and, thus, replacement is not intended to be required.

Debris trap 500 includes a disc-shaped housing 510 formed from first and second disc bodies 520, 530 secured to one another via ultrasonic welding (or other suitable engagement) and to retain a filter screen 540 therebetween, e.g., a 100 µm screen, or other suitable filter. First and second disc bodies 520, 530 includes fittings 522, 532, respectively, protruding outwardly therefrom in opposite directions and substantially diametrically opposed relative to disc-shaped housing 510. First disc body 520 defines a cavity 524 having a maximum width dimension at fitting 522 and tapering in width in a substantial radial direction towards fitting 532 to a minimum width dimension. Second disc body 530 defines a substantially constant width cavity 534, although other configurations are also contemplated. With first and second disc bodies 520, 530 secured with one another, an inner annular surface 526 of first disc body 520 retains an annular periphery of filter screen 540 against an opposing annular surface 536 of second disc body 530 such that filter screen 540 is retained in position separating but allowing fluid communication between cavities 524, 534.

Fittings 522, 532 define lumens therethrough in communication with respective cavities 524, 534. Fitting 522 is configured as the inlet while fitting 532 is configured as the outlet. More specifically, fitting 522 is configured to engage tubing connected to cleaning chamber 330 for receiving waste fluid therefrom while fitting 532 is configured to engage tubing connected to sheath fluid and waste pack 30 to deliver waste fluid from debris trap 500 thereto. The waste fluid enters cavity 524 of debris trap 500 via fitting 522 and due to the above-detailed configuration of cavity 524, debris are captured within cavity 524 without blocking filter screen 540 thus enabling fluid to pass through filter screen 540 into cavity 534 and, ultimately out fitting 532 to sheath fluid and waste pack 30.

Figure 26:
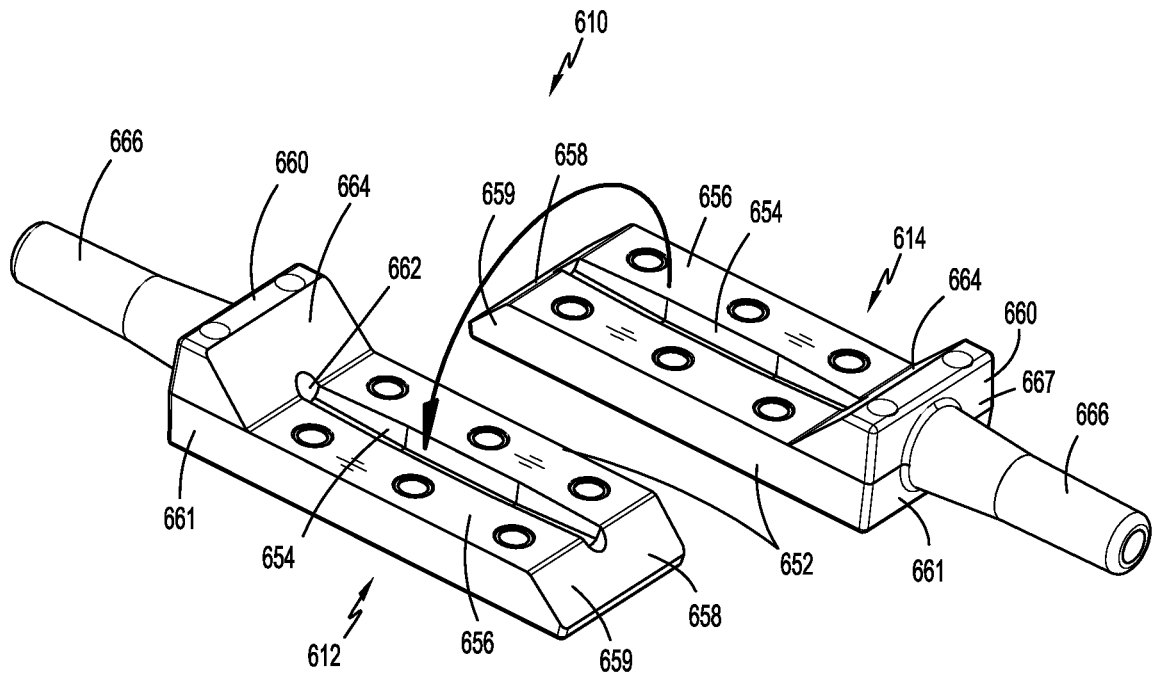
FIG. 26 is an exploded perspective view of the hemoglobin detection cell of FIG. 25.
Figure 27:
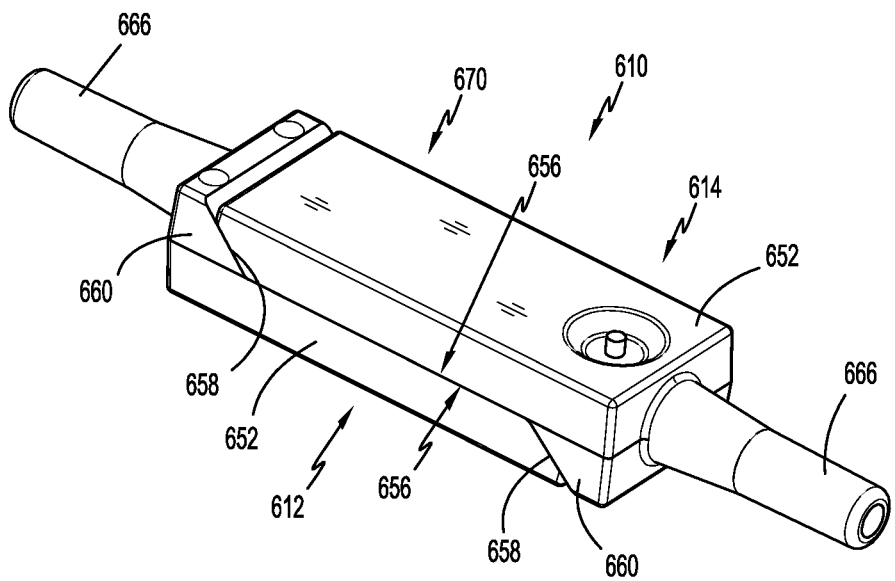
FIG. 27 is a perspective view of the hemoglobin detection cell of FIG. 25.
Figure 28A:
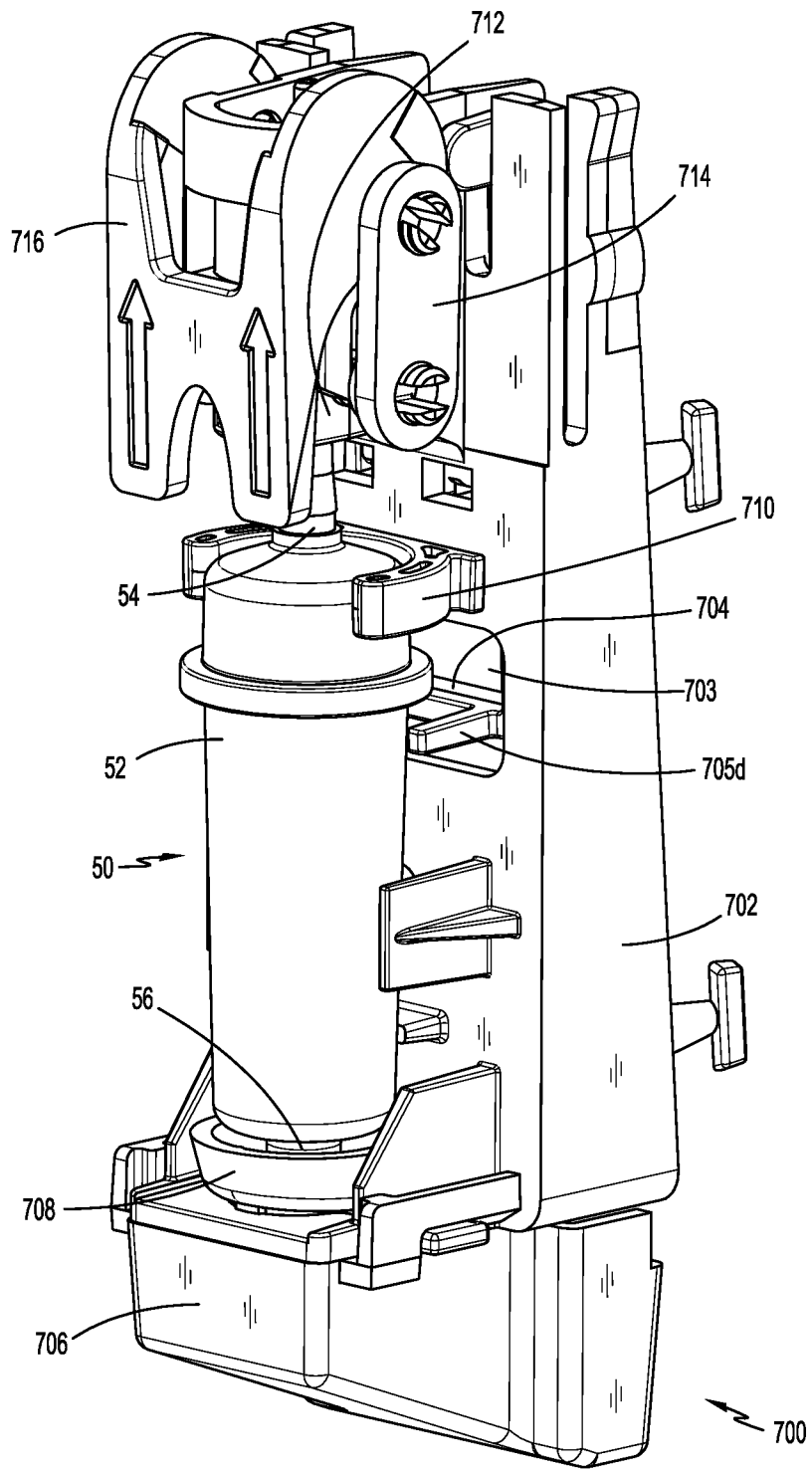
FIG. 28A is a perspective view of the filter holder and ejection assembly of the hematology analyzer of FIG. 1.
Figure 28B:
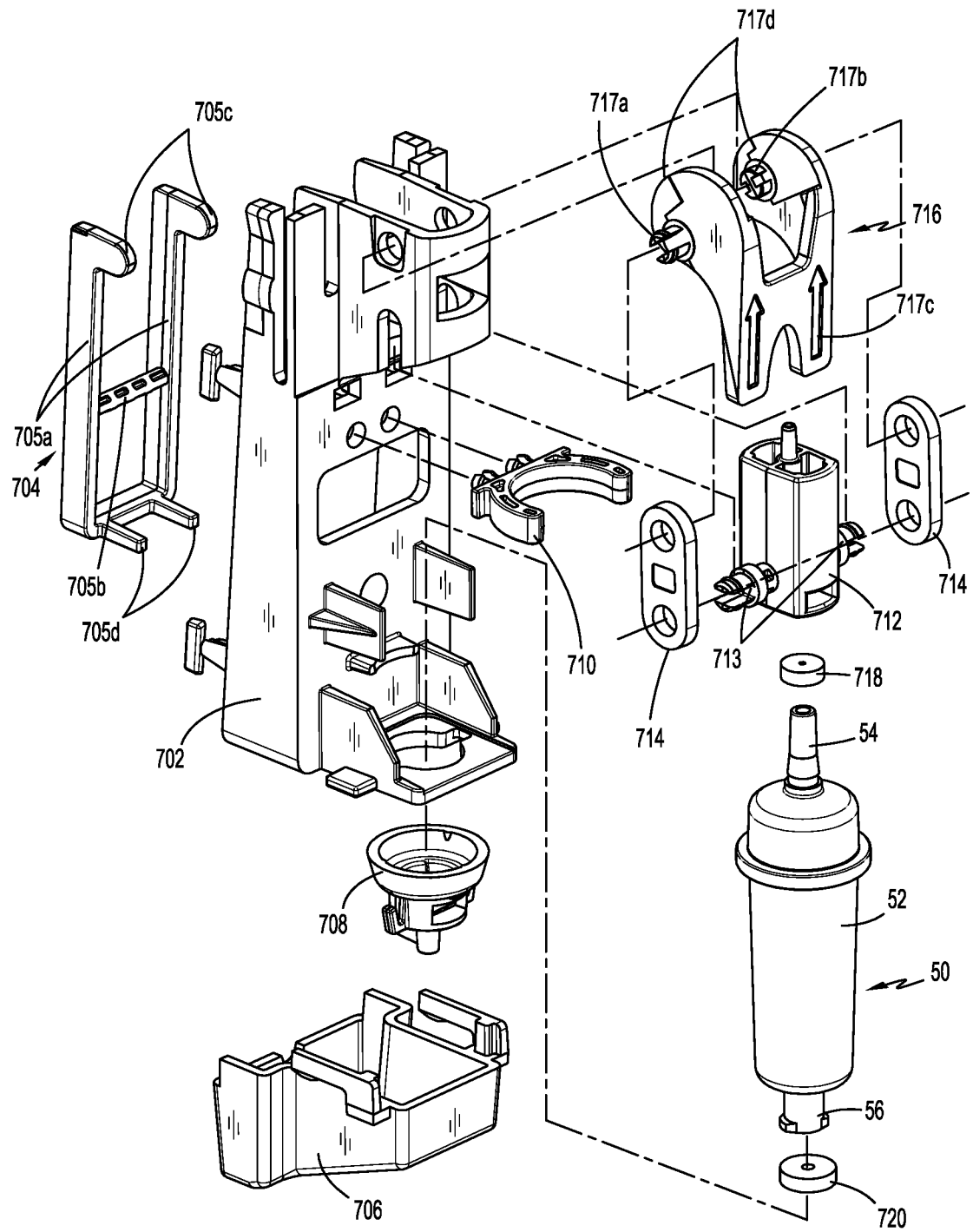
FIG. 28B is an exploded perspective view of the filter holder and ejection assembly of FIG. 28A.

Turning to FIGS. 25-27, hemoglobin assembly 600 is disposed in parallel with flow cell 810 of flow cytometer assembly 800. Hemoglobin assembly 600 includes hemoglobin detection cell 610 received within a complementary-shaped pocket 642 of a support structure 644 associated with mixing assembly 300. As also detailed above, hemoglobin assembly 600 includes a light source and sensor that are configured to enable absorption measurement at one or more separate wavelengths of light in order to determine a hemoglobin concentration in the sample.

Hemoglobin detection cell 610 is formed from two (2) pieces 612, 614 that are identical to one another. Each piece 612, 614 is formed from a light-transmissible material having high optical clarity, e.g., acrylic, and may be molded or otherwise formed. One piece 612, 614 is inverted and oppositely oriented relative to the other piece 612, 614 and then the pieces 612, 614 are secured to one another to form hemoglobin detection cell 610, e.g., via laser welding. Each piece 612, 614, more specifically, defines a rectangular body 652 having a channel 654 defined within an upper surface 656 of rectangular body 652 and extending along a length of rectangular body 652. An angled cut-out 658 is defined at a first end portion 659 of rectangular body 652 and an angled block 660 is disposed at a second end portion 661 of rectangular body 652. Angled cut-out 658 beings at upper surface 656 of rectangular body 652 and extends to the free end of first end portion 659 thereof such that first end portion 659 of rectangular body 652 tapers in height from upper surface 656 to free end of first end portion 659.

Angled block 660, as noted above, is disposed at second end portion 661 of rectangular body 652. Angled block 660, more specifically, sits atop second end portion 661 of rectangular body 652 and defines a channel that cooperates with a portion of channel 654 to define a lumen 662 extending between angled block 660 and rectangular body 652. Angled block 660 defines an angled inner surface 664 that is complementary to the angled surface defined by angled cut-out 658. Angled block 660 defines a maximum height equal to the maximum height of rectangular body 652. A fitting 666 is formed at and extends outwardly from an end face 667 defined by angled block 660 and rectangular body 652 and includes a lumen 668 disposed in communication with lumen 662. Fitting 666 is centered relative to end face 667.

As a result of the above-detailed configuration, when one of pieces 612, 614 is inverted, oppositely oriented relative to the other piece 612, 614, and placed thereon such that upper surfaces 656 mate with one another, angled cut-outs 658 receive angled blocks 660 such that a fully rectangular body 670 is formed and such that a continuous lumen extending between fittings 666 is formed.

Referring to FIGS. 28A-29D, filter holder and ejector assembly 700, as noted above, releasably retains filter 50 therein. Filter 50 includes a filter body 52, an inlet fitting 54 disposed at one end of filter body 52, and an outlet fitting 56 disposed at the other end of filter body 52.

Filter holder and ejector assembly 700 includes a base 702, a rear bracket 704, a bottom seat 706, a bottom cup 708, a clip 710, a cap 712, a pair of linkages 714, a pivoting handle 716, and a pair of gaskets 718, 720. Base 702 is fixedly secured to inner chassis 14 of analyzer 10 and is configured to operably support, directly or indirectly, the various other components of filter holder and ejector assembly 700. Rear bracket 704 includes a pair of spaced-apart rail 705a interconnected by a crossbar 705b that pivotably couples rear bracket 704 with base 702 on a rear side of base 702. A pair of cam lobes 705c extend from rails 705a at one end portion of rear bracket 704 (on one side of crossbar 705b) and a pair of feet 705d extend from rails 705a at a second, opposite end portion of rear bracket 704 (on an opposite side of crossbar 705b). As a result of this configuration, urging of cam lobes 705c in a first direction urges rear bracket 704 to pivot about crossbar 705b such that feet 705d are urged in a second, opposite direction, and vice versa. Feet 705d, more specifically, are selectively extendable through a window 703 defined within base 702 from a retracted position to an extended position in response to urging of cam lobes 705c in a reward direction.

Bottom seat 706 is supported on and depends from a bottom end portion of base 702. Bottom cup 708 defines an outlet, is seated within bottom seat 706, and receives first gasket 718 therein. Bottom cup 708 is configured to receive outlet fitting 56 of filter 50 therein while gasket 718 establishes a seal about the interface between the outlet of bottom cup 708 and outlet fitting 56 of filter 50 in the engaged condition of filter holder and ejector assembly 700.

Clip 710 is supported on and extends forwardly from base 702 at a generally intermediate position. Clip 710 is configured to receive, in snap-fit engagement, filter body 52 of filter 50 therein to thereby releasably engage filter 50 within filter holder and ejector assembly 700.

Cap 712 is coupled, in longitudinally slidable fashion, to a top end portion of base 702. Cap 712 defines an inlet and retains second gasket 720 therein. Cap 712 is configured to receive inlet fitting 54 of filter 50 therein while second gasket 720 establishes as seal about the interface between the inlet of cap 712 and inlet fitting 54 of filter 50 in the engaged condition of filter holder and ejector assembly 700. Cap 712 is movable between a disengaged position and an engaged position.

Linkages 714 are pivotably connected to bosses 713 of cap 712 at first end portions thereof and are pivotably coupled to first bosses 717a of pivoting handle 716 at second end portions thereof. Pivoting handle 716 further includes second bosses 717b that pivotably connect pivoting handle 716 with base 702 along a common pivot axis as the pivoting of linkages 714 and pivoting handle 716. Pivoting handle 716 additionally includes a lever 717c configured to facilitate pivoting of pivoting handle 716 between an eject position, a neutral position, and an engaged position.

Figure 29D:
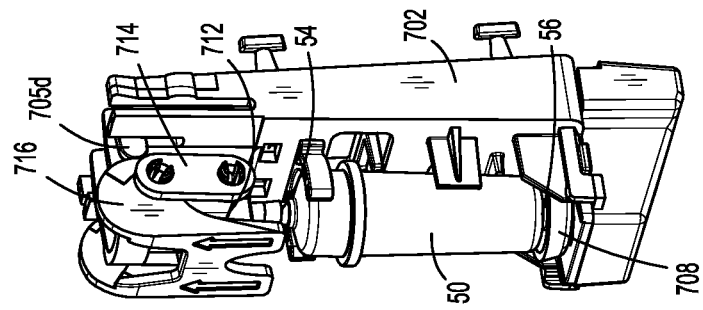
FIGS. 29A-29D are progressive perspective views illustrating insertion and engagement of a filter within the filter holder and ejection assembly of FIG. 28A.
Figure 29C:
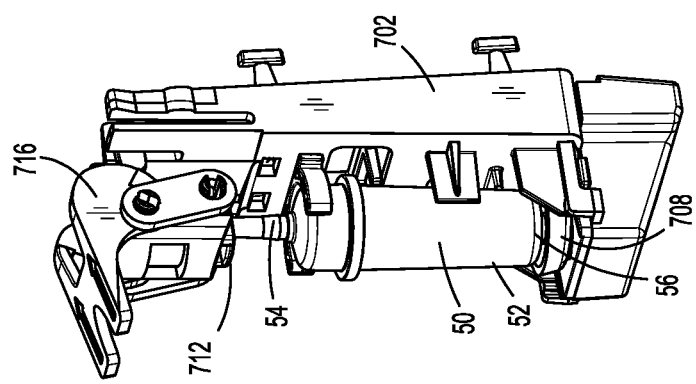
Figure 29B:
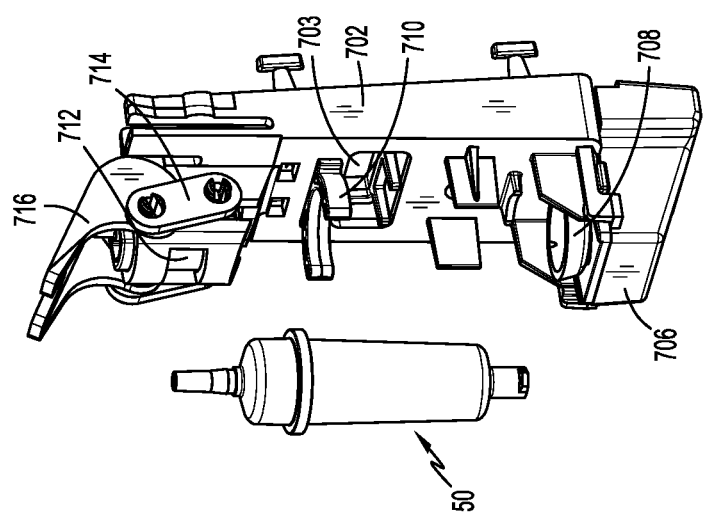
Figure 29A:
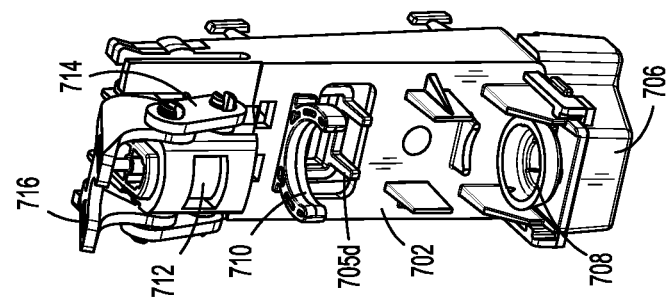

In use, with reference to FIGS. 29A-29D and initially to FIGS. 29A and 29B, to prepare filter holder and ejector assembly 700 for receipt of filter 50 therein, lever 717c of pivoting handle 716 is moved to the neutral position wherein cap 712 is disposed in the disengaged position and wherein feet 705d are disposed in the retracted position. Once this has been achieved, and with additional reference to FIG. 29C, filter 50 may be inserted into filter holder and ejector assembly 700 such that outlet fitting 56 of filter 50 is at least partially received within bottom cup 708 and such that clip 710 is engaged at least partially about filter body 52 of filter 50.

Next, referring also to FIG. 29D, lever 717c of pivoting handle 716 is pivoted downwardly from the neutral position to the engaged position to thereby slide cap 712 downwardly to the engaged position wherein filter 50 is retained in compression between gaskets 718, 720 of bottom cup 708 and cap 712, respectively, such that filter 50 is held in sealing engagement within filter holder and ejector assembly 700. Inlet and outlet tubing (not explicitly shown) is connected to bottom cup 708 and cap 712 to enable the flow of fluid, e.g., sheath fluid, through filter 50 and filter holder and ejector assembly 700 without leakage.

Referring again to FIGS. 29A-29D, in order to disengage and remove filter 50, pivoting handle 716 is pivoted from the engaged position through the neutral position to the eject position. Pivoting of pivoting handle 716 from the engaged position to the neutral position displaces cap 712 such that filter 50 is no longer held in compression between gaskets 718, 720 of bottom cup 708 and cap 712, respectively, while pivoting of pivoting handle 716 past the neutral position to the eject position urges cams surfaces 717d of pivoting handle 716 into contact with cam lobes 705c of rear bracket 704 to thereby pivot rear bracket 704 such that feet 705d are urged through window 703 defined within base 702 and into contact with filter body 52 of filter 50 to urge filter body 52 out of engagement with clip 710. Thus, filter 50 can be readily removed.

Turning back to FIG. 6, as noted above, filter 50 in combination with fluidic capacitor 732 and fluidic resistor 734 form fluidic capacitor-filter-resistor circuit 730 through which the sheath fluid passes. This circuit 730 controls the flow of the sheath fluid, which surrounds the sample core stream as it passes through flow cell 810, thereby facilitating establishment of the core stream flow through flow cell 810.

Figure 31:
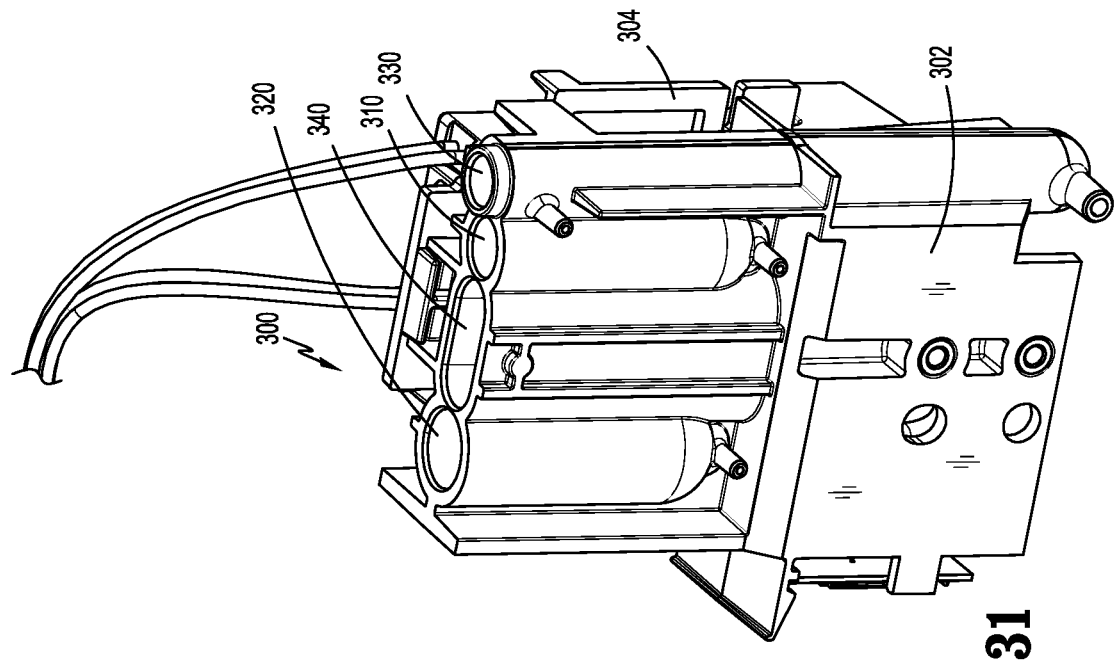
FIGS. 30 and 31 are respective front and rear perspective views of the mixing assembly of the hematology analyzer of FIG. 1.
Figure 30:
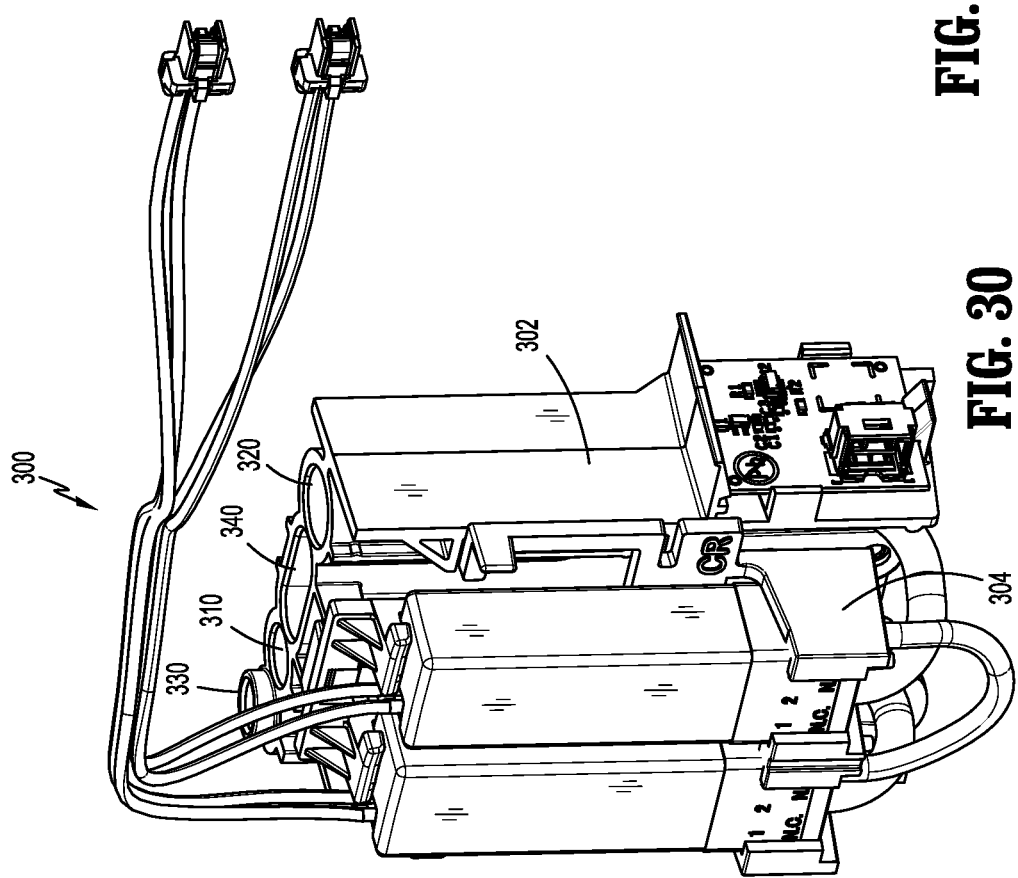
Figure 32:
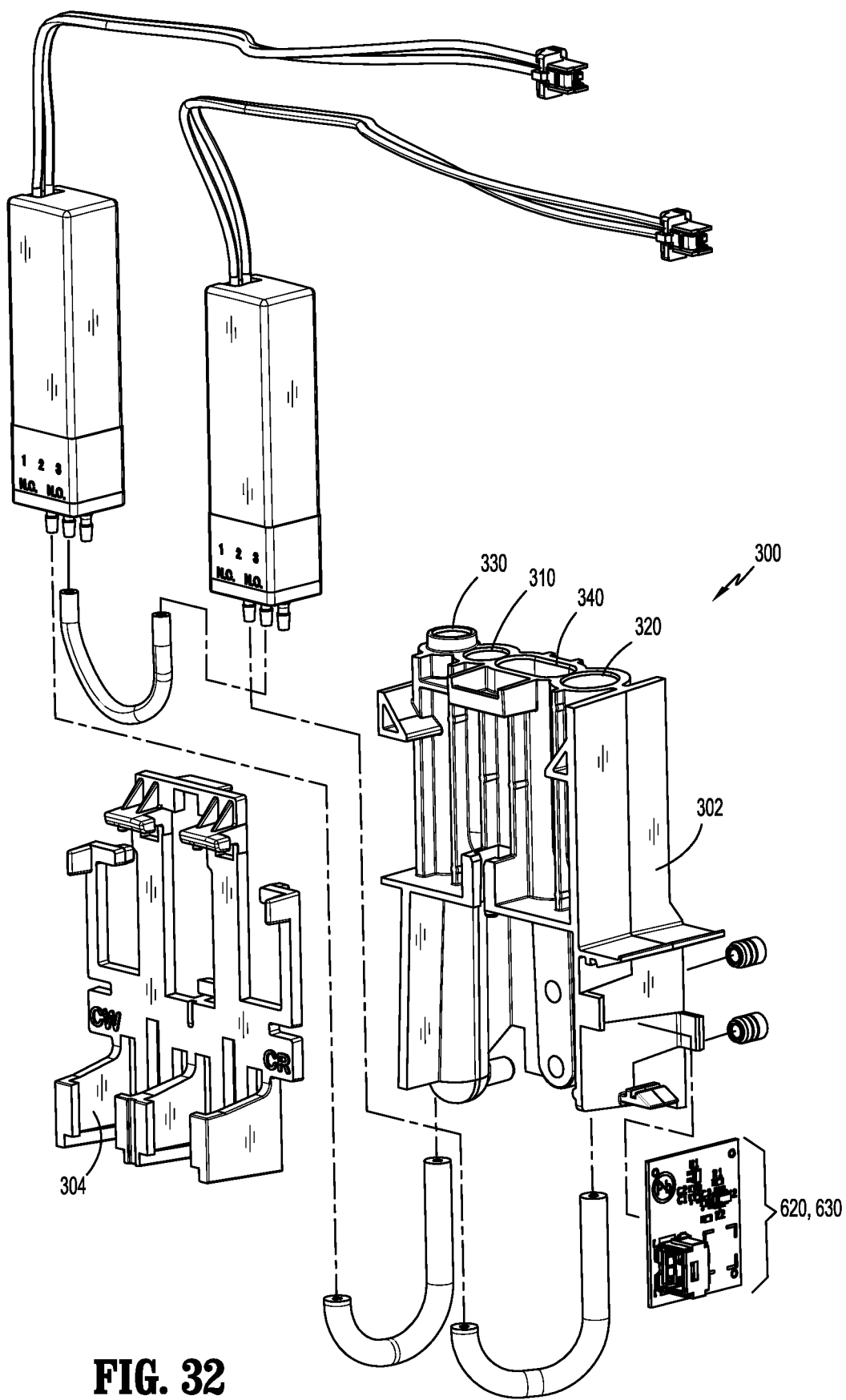
FIG. 32 is an exploded perspective view of the mixing assembly of FIGS. 30 and 31.

With reference to FIGS. 30-32, mixing assembly 300 includes multi-chamber mixing housing 302 that is fixedly secured to inner chassis 14 of analyzer 10. Mixing assembly 300 further includes a bracket 304 that is engaged with multi-chamber mixing housing 302 to mount valving thereon. Multi-chamber mixing housing 302, as also noted above, includes WBC chamber 310, RBC chamber 320, cleaning chamber 330, and clearance cavity 340 to enable operable interfacing of sample probe 110 and dilution probe 120 (FIGS. 13A and 13B) with one or more of chambers 310, 320, 330 as detailed herein to form the WBC dilution fluid, the RBC dilution fluid, and to facilitate cleaning, priming, and rinsing of probes 110, 120 (FIGS. 13A and 13B), and chambers 310, 320, 330. The use of mixing assembly 300 is detailed in conjunction with the run sequence described below.

Referring generally to FIG. 6 in conjunction with FIGS. 1, 3-5, 7, 8, 14A, 14B, and 30, the run sequence for analyzing a sample using analyzer 10 is described. The below run sequence details the ordering of the various functions performed during a sample run. In order to avoid obscuring the run sequence in unnecessary detail, the description of some or all of the actions that enable the various functions (such as, for example, energizing valves, reading sensors, providing feedback, refilling syringes, etc.), and/or some intermediate steps or processes, are omitted. Further, unless specifically contradicted below, the various steps may be performed in different order, simultaneously, or in overlapping temporal relation.

In preparation for a sample run, if not already present, sheath fluid and waste pack 30, reagent pack 40, and filter 50 are manually loaded into analyzer 10. A user interface of or associated with analyzer 10 prompts the user to repeatedly manually invert sample tube 70, e.g., ten times, to homogenize the sample before running it on analyzer 10. Once this has been accomplished, the user manually opens drawer 60, inserts sample tube 70 into receptacle 62 of drawer 60, manually closes the drawer 60, and presses the start button 98 to being the sample run.

A sample run is generally broken down into four stages: sample aspiration, dilution formation, dilution processing, and cleanup. Initially, prior to commencing the four stages noted above, all fluidic lines other than the waste lines from mixing assembly 300 are primed with sheath fluid and all syringe pumps 210-240 are set to the aspirated position.

With respect to sample aspiration, if sample tube 70 is stopped or capped, venting of sample tube 70 is first performed. To vent sample tube 70, robot assembly 100 translates carrier 102 from its home position to move sample probe 110 in the "y" direction into position in y-axis registration with sample tube 70. As detailed above, as robot assembly 100 translates carrier 102 in this manner, foot 144 of y-axis body 140 of robot assembly 100 contacts and urges shucker body 192 to pivot from the retracted position to the use position wherein sample tube retainer 194 of shucker body 192 clamps onto and centers the stopper or cap of sample tube 70 therein. Next, sheath syringe pump 240 aspirates air through sample probe 110 until the air passes sample vent valve 902. Robot assembly 100 then translates carrier 102 to move sample probe 110 in the "z" direction towards sample tube 70 such that the sharpened tip of sample probe 110 pierces the septum of the stopper or cap of sample tube 70 and extends into sample tube 70. Robot assembly 100 stops the "z" direction motion of sample probe 110 after piercing the stopper or cap but before the sharpened tip of sample probe 110 reaches the fluid level, e.g., blood sample surface, within sample tube 70. These and/or other motions relative to sample tube 70 are accomplished via impedance-based feedback, identification of the sample tube 70, and/or in any other suitable manner.

Continuing with the venting of sample tube 70, once sample probe 110 is positioned as noted above, e.g., slightly below stopper or cap but before the fluid level within sample tube 70, sample vent valve 902 is energized to thereby connect the interior of sample probe 110 to atmosphere, resulting in venting of sample tube 70 and equilibration of pressure.

After venting of sample tube 70, robot assembly 100 moves carrier 102 to return sample probe 110 in the "z" direction away from sample tube 70, e.g., opposite of the above-detailed "z" direction motion. Due to the potential for frictional engagement between sample probe 110 and the pierced septum of the stopper or cap of sample tube 70, sample tube retainer 194 of shucker body 190 retains sample tube 70 in position, inhibiting movement of sample tube 70 along with sample probe 110 in the "z" direction.

If sample tube 70 was stopped or capped and, thus, vented as detailed above, the sample line is re-primed after robot assembly 100 has sufficiently retracted sample probe 110 from sample tube 70 in the "z" direction. With respect to the re-priming, robot assembly 100 translates carrier 102 to move sample probe 110 in the "y" direction into y-axis registration with cleaning chamber 330 of mixing assembly 300 and then in the "z" direction to the bottom of cleaning chamber 330. As carrier 102 is moved in the "y" direction away from sample tube 70, shucker body 192, under bias, is pivot from the use position back to the retracted position.

With sample probe 110 positioned at the bottom of cleaning chamber 330, sheath syringe pump 240 is activated to dispense sheath fluid through sample probe 110 (with some of the sheath fluid exiting sample probe 110 into cleaning chamber 330), thus re-priming the sample line. Robot assembly 100 then moves carrier 102 to return sample probe 110 in the "z" direction to withdraw sample probe 110 from cleaning clamber 330.

Once venting and re-priming are completed (if necessary) sample aspiration may commence by robot assembly 100 translating carrier 102 to move sample probe 110 in the "y" direction into position in y-axis registration with sample tube 70. This movement urges foot 144 of y-axis body 140 of robot assembly 100 to again contact and, in turn, urge shucker body 192 to pivot from the retracted position to the use position to clamp onto and center sample tube 70 therein.

Robot assembly 100 then translates carrier 102 to move sample probe 110 in the "z" direction into sample tube 70 to the bottom thereof or sufficiently below the sample surface to enable aspiration of a suitable sample volume. Sample syringe pump 210 is then activated to aspirate a pre-determined volume of sample from sample tube 70 into the sample probe line via sample probe 110. Robot assembly 100 then moves carrier 102 to retract sample probe 110 (via movement thereof in the "z" direction) from sample tube 70.

In parallel with sample aspiration as detailed above, or at any other suitable point during a run sequence, a dark read, e.g., with the light source turned off, from hemoglobin assembly 600 may be performed, followed by a sheath read from hemoglobin assembly 600 with the light source turned on.

Continuing with reference generally to FIG. 6 in conjunction with FIGS. 1, 3-5, 7, 8, 14A, 14B, and 30, dilution formation, the next stage of the run sequence, involves cleaning of sample probe 110, RBC dilution formation, and WBC dilution formation. Cleaning of sample probe 110 is accomplished by robot assembly 100 first translating carrier 102 to move sample probe 110 into y-axis registration with cleaning chamber 330 and then in the "z" direction to advance sample probe 110 to the bottom of cleaning chamber 330. With sample probe 110 disposed at the bottom of cleaning chamber 330, sheath syringe pump 240 is activated to pump sheath fluid into cleaning chamber 330 to a sufficient volume above the outlet of sample probe 110 at the sharpened tip thereof. In some embodiments, cleaning chamber 330 is substantially filled. Next, peristaltic pump 400 is activated to aspirate the sheath fluid from cleaning chamber 330, thereby draining cleaning chamber 330 to sheath fluid and waste pack 30. This serves to rinse the outer surface of at least a tip portion of sample probe 110 (removing debris accumulated from piercing the stopper or cap, for example). In some embodiments, the above rinsing may be repeated one or more times.

After rinsing sample probe 110 in cleaning chamber 330, robot assembly 100 moves carrier 102 to retract sample probe 110 in the "z" direction and out of cleaning chamber 330. Next or therewith, peristaltic pump 400 aspirates the fluid from cleaning chamber 330 to sheath fluid and waste pack 30.

Robot assembly 100 translates carrier 102 to move sample probe 110 in the "y" direction into y-axis registration with RBC chamber 320 of mixing assembly 300, RBC reagent syringe pump 230 initially pumps a pre-determined volume of RBC reagent into RBC chamber 320, and robot assembly 100 translates carrier 102 to move sample probe 110 in the "z" direction into and to the bottom of RBC chamber 320 (or otherwise below the reagent fluid level). Next, in parallel (substantially simultaneously, overlapping, etc.), sample syringe pump 210 is activated to pump a pre-determined volume of sample through sample probe 110 and into RBC chamber 320 and RBC reagent syringe pump 230 pumps plural pulses of a predetermined volume of RBC reagent from reagent pack 40 to RBC chamber 320. The diameter of the reagent inlet port into RBC chamber 320 and the offset position thereof creates an increased fluid velocity of incoming RBC reagent that vortexes the RBC reagent and sample to homogeneously mix the dilution.

After the sample and RBC reagent are dispensed into RBC chamber 320 (although some dispensing may still occur), robot assembly 100 translates carrier 102 to withdraw sample probe 110 from RBC chamber 320.

WBC dilution formation is accomplished in a similar manner as the above-detailed RBC dilution formation except that WBC reagent syringe pump 220 and WBC chamber 310 are utilized and the pre-determined volumes and number of pulses may be different.

The third stage of a sample run is dilution processing, which includes WBC dilution transport, WBC dilution acquisition, cleaning of sample probe 110 and re-priming of sample syringe pump 210, RBC dilution transport, and RBC dilution acquisition. WBC dilution transport is initiated by robot assembly 100 translating carrier 102 to move dilution probe 120 in the "y" direction into y-axis registration with WBC chamber 310 of mixing assembly 300. Next, peristaltic pump 400 aspirates air through the dilution transport line to clear the line. Once the line is clear, robot assembly 100 moves carrier 102 to extend dilution probe 120 into and to the bottom of WBC chamber 310. Peristaltic pump 400 then aspirates the WBC dilution through hemoglobin detection cell 610 and towards flow cell 810 of flow cytometer assembly 800.

WBC dilution acquisition is accomplished by performing, in parallel, dispensing of WBC dilution to flow cell 810 (via sample syringe pump 210) and dispensing of sheath fluid to flow cell 810 (via sheath syringe pump 240). This dispensing sets up and stabilizes the core stream flow through the flow cell 810 to facilitate data acquisition of the core stream using flow cytometer assembly 800. This dispensing may be accomplished, with respect to sheath fluid delivery, by first dispensing a first volume of sheath fluid to flow cell 810 at a first rate, followed by dispensing a second, different volume of sheath fluid to flow cell 810 at a second, different rate. With respect to sample delivery, a first volume of sample is initially delivered to flow cell 810 at a first rate, followed by delivery of a second volume of sample to flow cell 810 at a second rate, and subsequent delivery of a third volume of sample to flow cell 810 at a third rate. The laser optics assembly of flow cytometer assembly 800 is activated to begin data acquisition after a pre-determined delay from completion of the second sample delivery/start of the third sample delivery. The laser optics assembly of flow cytometer assembly 800 is deactivated after completion of the third delivery to end data acquisition. The sample and sheath fluid passing through flow cell 810 proceed to sheath fluid and waste pack 30.

Once the above-detailed WBC dilution acquisition is complete, robot assembly 100 translates carrier 102 to move dilution probe 120 in the "z" direction to withdrawn dilution probe 120 from WBC chamber 310.

Cleaning of sample probe 110 and re-priming of sample syringe pump 210 initially involves peristaltic pump 400 aspirating any fluid left in cleaning chamber 330 to sheath fluid and waste pack 30 and robot assembly 100 translating carrier 102 to move sample probe 110 in the "y" direction into y-axis registration with cleaning chamber 330. With sample probe 110 disposed in this position, the following actions are accomplished in parallel: sheath syringe pump 240 is activated to pump sheath fluid through sample probe 110 and into cleaning chamber 330; robot assembly 100 translates carrier 102 to thereby move sample probe 110 to the bottom of cleaning chamber 330; and peristaltic pump 400 is activated to aspirate the fluid from cleaning chamber 330, thereby draining cleaning chamber 330 to sheath fluid and waste pack 30. These parallel actions clean the inside of sample probe 110 and also rinse the interior of cleaning chamber 330. Following this cleaning, re-priming of sample syringe pump 210 is accomplished by activating sheath syringe pump 240 to dispense sheath fluid through sample probe 110 and into cleaning chamber 330, e.g., in embodiments, to substantially fill cleaning chamber 330, and sample syringe pump 210 is activated to aspirate sheath fluid from cleaning clamber 330 into the sample probe line, thereby re-priming the line for the subsequent RBC dilution transport and acquisition. Finally, robot assembly 100 translates carrier 102 to move dilution probe 120 in the "z" direction to withdrawn dilution probe 120 from cleaning chamber 330.

In parallel with the cleaning of sample probe 110 and re-priming of sample syringe pump 210, or at any other suitable point during a run sequence, hemoglobin assembly 600 takes a sample read of the WBC dilution that is still in the hemoglobin detection cell 610 from the dilution transport noted above.

With continued general reference to FIG. 6 in conjunction with FIGS. 1, 3-5, 7, 8, 14A, 14B, and 30, RBC dilution acquisition is accomplished in a similar manner as the above-detailed WBC dilution formation except that RBC chamber 320 is utilized and some of the fluid volumes and flow rates may be different. In particular, RBC dilution acquisition involves the dispensing of RBC dilution to flow cell 810 (via sample syringe pump 210) in parallel with the dispensing of sheath fluid to flow cell 810 (via sheath syringe pump 240). More specifically, this dispensing may be accomplished, with respect to sheath fluid delivery, by first dispensing a first volume of sheath fluid to flow cell 810 at a first rate, followed by dispensing a second, different volume of sheath fluid to flow cell 810 at a second, different rate. With respect to sample delivery, a first volume of sample is initially delivered to flow cell 810 at a first rate, followed by delivery of a second volume of sample to flow cell 810 at a second rate, and subsequent delivery of a third volume of sample to flow cell 810 at a third rate. The laser optics assembly of flow cytometer assembly 800 is activated to begin data acquisition after a pre-determined delay from completion of the second sample delivery/start of the third sample delivery. The laser optics assembly of flow cytometer assembly 800 is deactivated after completion of the third delivery to end data acquisition. The sample and sheath fluid passing through flow cell 810 proceed to sheath fluid and waste pack 30. Finally, robot assembly 100 translates carrier 102 to move dilution probe 120 in the "z" direction to withdrawn dilution probe 120 from RBC chamber 320.

The fourth stage of sample run, cleanup, involves draining of chambers 310, 320, 330 of mixing assembly 300, refilling of reagent syringe pumps 220, 230, rinsing of cleaning chamber 330, cleaning of dilution probe 120, cleaning of flow cells 810, cleaning of RBC chamber 320, and cleaning of WBC chamber 310.

Peristaltic pump 400 aspirates air to clear any remaining dilution from the dilution probe line and aspirate any remaining fluid from WBC chamber 310, RBC chamber 320, and/or cleaning chamber 330, to sheath fluid and waste pack 30, thus draining chambers 310, 320, 330. Refilling of reagent syringe pumps 220, 230 is provided by activating WBC reagent syringe pump 220 and RBC reagent syringe pump 230 to aspirate reagent from reagent pack 40 to the respective syringe pump 220, 230.

Rinsing of cleaning chamber 330 is subsequently accomplished by robot assembly 100 first translating carrier 102 to move sample probe 110 in the "y" direction into y-axis registration with cleaning chamber 330, followed by, in parallel: sheath syringe pump 240 pumping sheath fluid through the sample probe line and into cleaning chamber 330, robot assembly 100 translating carrier 102 to move sample probe 110 in the "z" direction to advance sample probe 110 to the bottom of cleaning chamber 330, and peristaltic pump 400 aspirating the fluid from cleaning chamber 330 to sheath fluid and waste pack 30. Thereafter, robot assembly 100 translates carrier 102 to withdraw sample probe 110, in the "z" direction, from within cleaning chamber 330. In some embodiments, the above rinsing may be repeated one or more times.

Next, with respect to cleaning of dilution probe 120, robot assembly 100 translates carrier 102 to move dilution probe 120 in the "y" direction into y-axis registration with cleaning chamber 330 and then in the "z" direction to the bottom of cleaning chamber 330. Thereafter, in parallel: sheath syringe pump 240 pumps sheath fluid through the dilution probe line and into cleaning chamber 330, and peristaltic pump 400 aspirates the fluid from cleaning chamber 330 to sheath fluid and waste pack 30. In some embodiments, the above rinsing may be repeated one or more times.

In order to perform flow cell cleaning, sheath syringe pump 240 dispenses a sufficient volume of sheath fluid to cleaning chamber 330; in some embodiments, substantially filling cleaning chamber 330. Thereafter, peristaltic pump 400 aspirates the sheath fluid from cleaning chamber 330 to flow cell 810 through the dilution probe line. In parallel, sample syringe pump 210 and sheath syringe pump 240 both dispense sheath fluid to flow cell 810. In some embodiments, the above rinsing may be repeated one or more times. After this rinsing(s), peristaltic pump 400 aspirates the fluid from cleaning chamber 330 to sheath fluid and waste pack 30 and robot assembly 100 translates carrier 102 to withdraw dilution probe 120, in the "z" direction, from within cleaning chamber 330.

Cleaning of RBC chamber 320 involves robot assembly 100 translating carrier 102 to move sample probe 110 in the "y" direction into y-axis registration with RBC chamber 320 and then in the "z" direction such that the output of sample probe 110 is slightly below the top of RBC chamber 320. Once this position is achieved, sheath syringe pump 240 pumps sheath through the sample probe line to substantially fill (or dispense another volume into) RBC chamber 320, and peristaltic pump 400 aspirates the fluid from RBC chamber 320 to sheath fluid and waste pack 30. The above rinsing may be repeated one or more times. Finally, robot assembly 100 translates carrier 102 to move sample probe 110 in the "z" direction to withdraw sample probe 110 from RBC chamber 320.

Cleaning of WBC chamber 310 is accomplished in a similar manner as the above-detailed cleaning of RBC chamber 320, except that WBC chamber 310 is utilized and, subsequent to the rinsing(s), robot assembly 100 moves carrier 102 to return to the home position. Thus, analyzer 10 is re-set for subsequent sample run(s), which are accomplished by repeating the above run sequence.

Referring in particular to FIG. 14B, the above-detailed run sequence is substantially the same (except, for example, use of different dilution ratios) with respect to a sequence run of fluid from on-board control tube 80, which contains synthetic particles suspended in fluid. These control runs may be performed periodically at intervals (elapsed time intervals, use time intervals, time of day intervals, number of run intervals, etc.), upon request, and/or upon occurrence of one or more conditions (a movement threshold, a temperature change threshold, a prolonged inactivity threshold, replacement of a component(s)), etc. On-board control tube 80 is configured to remain in analyzer 10 through plural runs and, thus, a motor (not explicitly shown) is provided in drawer 60 to rotate control tube 80 and mix the contents before a sample therefrom is utilized in a control run sequence. The run sequence of the fluid from on-board control tube 80 is used to check calibration and to perform self-calibration, if needed.

The analyzer, devices, systems, and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may be located within a device or system at an end-user location, may be located within a device or system at a manufacturer or servicer location, or may be a cloud computing processor located at a cloud computing provider. The controller may also include a memory to store data and/or instructions that, when executed by the one or more processors, causes the one or more processors to perform one or more methods and/or algorithms.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. An analyzer, comprising:
an inner chassis;
a housing surrounding the inner chassis;
a sample probe operably coupled to the inner chassis within the housing and movable relative thereto;
a dilution probe operably coupled to the inner chassis within the housing and movable relative thereto;
a mixing housing supported on the inner chassis within the housing, the mixing housing defining a first mixing chamber and a second mixing chamber, each of the first and second mixing chambers configured to receive dilution fluid, wherein the mixing housing further defines a clearance cavity, the clearance cavity configured to receive one of the sample probe or the dilution probe when the other of the sample probe or the dilution probe is inserted into one of the first or second mixing chambers;
a flow cytometer supported on the inner chassis within the housing, the flow cytometer including a flow cell;
a sample pump disposed within the housing and configured to perform a first plurality of tasks including: aspirating sample into the sample probe, dispensing sample from the sample probe into the first mixing chamber, dispensing sample from the sample probe into the second mixing chamber, delivering first sample-dilution fluid mixture to the flow cell, and delivering second sample-dilution fluid mixture to the flow cell; and
a sheath pump disposed within the housing and configured to perform a second plurality of tasks including: dispensing sheath to the flow cell in cooperation with the delivery of the first sample-dilution fluid mixture to the flow cell, and dispensing sheath to the flow cell in cooperation with the delivery of the second sample-dilution fluid mixture to the flow cell.

2. The analyzer according to claim 1, further comprising a carrier supporting the sample probe and the dilution probe in fixed orientation relative to one another, the carrier operably coupled to the inner chassis within the housing and movable relative thereto to operably position the sample probe and the dilution probe for enabling at least some of the first and second pluralities of tasks.

3. The analyzer according to claim 2, further comprising a robot assembly configured to maneuver the carrier in a y-direction and a z-direction relative to the inner chassis to thereby position the sample probe and the dilution probe for enabling the at least some of the first and second pluralities of tasks.

4. The analyzer according to claim 3, wherein the robot assembly further includes y-axis and z-axis potentiometers configured to enable feedback-based control of movement of the carrier in each of the y-direction and the z-direction.

5. The analyzer according to claim 1, further comprising first and second dilution pumps disposed within the housing and configured to deliver the dilution fluid to the first and second mixing chambers, respectively.

6. The analyzer according to claim 1, further comprising a peristaltic pump configured to perform a third plurality of tasks including: aspirating the first sample-dilution fluid from the first mixing chamber into the dilution probe, aspirating the second sample-dilution fluid from the second mixing chamber into the dilution probe, aspirating the first sample-dilution fluid mixture through the dilution probe in preparation for delivery thereof to the flow cell, aspirating the second sample-dilution fluid mixture through the dilution probe in preparation for delivery thereof to the flow cell, aspirating remaining fluid in the first mixing chamber to waste, and aspirating remaining fluid in the second mixing chamber to waste.

7. The analyzer according to claim 1, wherein the second plurality of tasks further includes: dispensing sheath to the first mixing chamber to clean the first mixing chamber, and dispensing sheath to the second mixing chamber to clean the second mixing chamber.

8. The analyzer according to claim 1, wherein the mixing housing further defines a cleaning chamber, and wherein the second plurality of tasks further includes: dispensing sheath to the cleaning chamber to clean a portion of the sample probe disposed therein.

9. The analyzer according to claim 1, further comprising a hemoglobin assembly disposed in parallel with the flow cell.

10. The analyzer according to claim 1, further comprising a fluidic circuit configured to control the flow of sheath therethrough, the fluidic circuit disposed within a sheath flow line such that sheath dispensed to the flow cell passes through the fluidic circuit.

\* \* \* \* \*